United States Patent
Yoshida

(10) Patent No.: US 8,246,457 B2
(45) Date of Patent: Aug. 21, 2012

(54) STORAGE MEDIUM HAVING GAME PROGRAM STORED THEREON AND GAME APPARATUS

(75) Inventor: Misuzu Yoshida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 947 days.

(21) Appl. No.: 11/594,110

(22) Filed: Nov. 8, 2006

(65) Prior Publication Data
US 2008/0039200 A1 Feb. 14, 2008

(30) Foreign Application Priority Data
Aug. 7, 2006 (JP) .................. 2006-214929

(51) Int. Cl.
*A63F 13/00* (2006.01)
(52) U.S. Cl. ................ 463/36; 463/37; 463/38
(58) Field of Classification Search .............. 463/30–31, 463/36–38, 43, 44; 345/161
See application file for complete search history.

(56) References Cited

U.S. PATENT DOCUMENTS

| | | | | |
|---|---|---|---|---|
| 6,084,573 A | * | 7/2000 | Tsai et al. ............... | 345/161 |
| 6,375,572 B1 | * | 4/2002 | Masuyama et al. ......... | 463/43 |
| 6,641,482 B2 | * | 11/2003 | Masuyama et al. ......... | 463/44 |
| 6,908,386 B2 | * | 6/2005 | Suzuki et al. .............. | 463/30 |
| 6,908,388 B2 | * | 6/2005 | Shimizu et al. ............ | 463/31 |
| 7,351,152 B2 | * | 4/2008 | Abe et al. ................. | 463/43 |
| 2004/0029640 A1 | * | 2/2004 | Masuyama et al. ......... | 463/43 |

FOREIGN PATENT DOCUMENTS

JP 2000-300843 10/2000
JP 2001-170358 6/2001

* cited by examiner

*Primary Examiner* — Dmitry Suhol
*Assistant Examiner* — Ankit Doshi
(74) *Attorney, Agent, or Firm* — Nixon & Vanderhye P.C.

(57) ABSTRACT

In an acceleration value obtaining step (S2), an acceleration value which changes in accordance with a state of the input device is sequentially obtained as the input value. In an increase/decrease direction inversion detection step (S3, S17), it is detected that an acceleration value increase/decrease direction has inverted. In an acceleration value difference calculation step (S41 through S44), when the acceleration value increase/decrease direction has inverted, a difference between at least two acceleration values obtained immediately before the inversion is calculated. In a game processing step (S12 through S15), when the calculated difference is equal to or greater than a predetermined value, first game processing is executed, and when the calculated difference is smaller than the predetermined value, second game processing different from the first game processing is executed.

23 Claims, 16 Drawing Sheets

STORAGE MEDIUM HAVING GAME PROGRAM STORED THEREON AND GAME APPARATUS

CROSS REFERENCE TO RELATED APPLICATION

The disclosure of Japanese Patent Application No. 2006-214929 filed on Aug. 7, 2006 is incorporated herein by reference.

BACKGROUND OF THE INVENTION

1. Field of the Invention

The present invention relates to a storage medium having stored thereon a game program for causing a computer of a game apparatus to execute game processing based on an input value which changes in accordance with the motion of an input device itself, and a game apparatus; and more specifically to detection of a motion of the input device itself.

2. Description of the Background Art

Conventionally, a game system by which a player can enjoy moving an input device itself (controller) using an acceleration sensor has been proposed. For example, a shooting game using a gun-type controller having a built-in acceleration sensor has been proposed (for example, Japanese Laid-Open Patent Publication No. 2000-300843). In this shooting game, the moving direction of the gun-type controller is detected by the acceleration sensor. When the player moves the gun-type controller rightward by mimicking the motion of opening the revolver of the gun, an image of bullets is displayed on the monitor, so that the player can confirm the remaining number of bullets. When the player moves the gun-type controller up and down in this state, the gun can be additionally loaded. When the player moves the gun-type controller leftward by mimicking the motion of closing the revolver, the image of bullets disappears. In this manner, the moving direction of the gun-type controller is determined by the acceleration sensor, and game processing in accordance with the moving direction is executed.

A game of determining an impact which is input to a mobile game apparatus itself using an acceleration sensor has been proposed (for example, Japanese Laid-Open Patent Publication No. 2001-170358). In this game, a change in the magnitude or direction of acceleration applied to a game apparatus (housing) is detected, and how much output has been made in which axial direction is determined. For example, when the game apparatus is slid in an X-axis direction, an acceleration is generated. Based on the X-axis output of the acceleration sensor, the movement in the X-axis direction (sliding movement) is determined. If, at this point, the X-axis output has a value equal to or greater than a predetermined value, it is determined that an impact input has been made. For example, when an acceleration having a value equal to or greater than the predetermined value is detected in a positive X-axis direction, it is determined that an impact input from the left has been made. When an acceleration having a value equal to or greater than the predetermined value is detected in a negative X-axis direction, it is determined that an impact input from the right has been made.

However, the conventional game apparatuses described in the above-mentioned publications have the following problems. With the game disclosed in Japanese Laid-Open Patent Publication No. 2000-300843, it is determined at how much strength, and in which direction, the gun-type controller itself was moved. It is impossible to accurately determine whether the operation made by the player is an operation of, for example, swinging the gun-type controller or an operation of applying an impact to the gun-type controller.

With the game apparatus disclosed in Japanese Laid-Open Patent Publication No. 2001-170358, it is determined whether or not an impact input was made by determining whether the magnitude of acceleration is equal to or greater than a predetermined value. However, even when an operation of moving the game apparatus is made, an acceleration having a value equal to or greater than the predetermined value may be detected (when, for example, the player makes an operation of strongly swinging the game apparatus). This may be incorrectly recognized as an impact input. Thus, when an acceleration having a value equal to or greater than the predetermined value is detected, it is difficult to precisely determine whether the player makes a motion of moving the game apparatus (strongly swings the game apparatus) or applies an impact to the game apparatus.

SUMMARY OF THE INVENTION

Therefore, an embodiment(s) of the present invention provides a storage medium having stored thereon a game program capable of accurately detecting an operation made by a player of applying an impact to an input device or the like and reflecting the operation on the game, and a game apparatus.

The reference numerals, step numbers, additional descriptions and the like in parentheses in this section of the specification indicate the correspondence with the embodiments described later for easier understanding of the present invention, and do not limit the present invention in any way.

A first aspect of an embodiment of the present invention is directed to a storage medium having stored thereon a game program for causing a computer of a game apparatus to execute game processing based on an input value which changes in accordance with a motion of an input device itself. The game program causes the computer to execute an acceleration value obtaining step (S2), an increase/decrease direction inversion detection step (S3, S17), an acceleration value difference calculation step (S41 through S44), and a game processing step (S12 through S15). The acceleration value obtaining step sequentially obtains, as the input value, an acceleration value which changes in accordance with a state of the input device, based on an output from an acceleration sensor (701) included in the input device, and stores the acceleration value in a storage section (33). The increase/decrease direction inversion detection step detects that an acceleration value increase/decrease direction has inverted based on the acceleration value stored in the storage section. The acceleration value difference calculation step, when the acceleration value increase/decrease direction has inverted, calculates a difference between at least two acceleration values obtained immediately before the inversion. The game processing step, when the difference calculated in the acceleration value difference calculation step is equal to or greater than a predetermined value, executes first game processing, and when the difference calculated in the acceleration value difference calculation step is smaller than the predetermined value, executes second game processing which is different from the first game processing.

In a second aspect based on the first aspect, the increase/decrease direction inversion detection step includes a first inversion detection step (S17) and a second inversion detection step (S3). The first inversion detection step detects that the acceleration value increase/decrease direction is inverted from a first direction to a second direction. The second inversion detection step, after the detection in the first inversion detection step, detects that the acceleration value increase/decrease direction has inverted from the second direction to the first direction. In the acceleration value difference calculation step, when the second inversion detection step detects the inversion, the computer calculates a difference between at least two acceleration values obtained immediately before the inversion.

In a third aspect based on the second aspect, the acceleration value difference calculation step includes a first difference calculation step (S41, S42) and a second difference calculation step (S43, S44). The first difference calculation step calculates a first difference between two acceleration values obtained at a first time interval immediately before the inversion detected in the second inversion detection step. The second difference calculation step calculates a second difference between two acceleration values obtained at a second time interval, which is different from the first time interval, immediately before the inversion detected in the second inversion detection step. In the game processing step, when at least one of the first difference and the second difference is equal to or greater than the predetermined value, the computer executes the first game processing; and when both the first difference and the second difference are smaller than the predetermined value, the computer executes the second game processing.

In a fourth aspect based on the second aspect, the game program causes the computer to further execute a first obtained value counting step (S46) and a second obtained value counting step (S31). The first obtained value counting step counts a first number of acceleration values obtained in the acceleration value obtaining step after the detection in the first inversion detection step before the detection in the second inversion detection step. The second obtained value counting step counts a second number of acceleration values obtained after the detection in the second inversion detection step before the detection in the first inversion detection step. In the game processing step, only when a sum of the first number and the second number is equal to or greater than a predetermined value and the first number is smaller than the second number, the computer executes the first game processing.

In a fifth aspect based on the second aspect, in the acceleration value difference calculation step, only when the acceleration value when the inversion is detected in the first inversion detection step is equal to or greater than a predetermined value, the computer calculates the difference between the two acceleration values.

In a sixth aspect based on the second aspect, the game program causes the computer to further execute an acceleration determination step of, when the inversion is detected in the second inversion detection step, determining whether or not the acceleration value obtained immediately before the inversion is equal to or greater than a predetermined value. In the game processing step, when the acceleration value is determined to be equal to or greater than the predetermined value in the acceleration determination step, the computer executes the first game processing; and when the acceleration value is determined to be smaller than the predetermined value in the acceleration determination step, the computer executes the second game processing.

A seventh aspect according to an embodiment of the present invention is directed to a game apparatus (3) for executing game processing based on an input value which changes in accordance with a motion of an input device itself. The game apparatus comprises an acceleration value obtaining section (30), an increase/decrease direction inversion detection section (30), an acceleration value difference calculation section (30), and a game processing section (30). The acceleration value obtaining section sequentially obtains, as the input value, an acceleration value which changes in accordance with a state of the input device, based on an output from an acceleration sensor (701) included in the input device, and stores the acceleration value in a storage section. The increase/decrease direction inversion detection section detects that an acceleration value increase/decrease direction has inverted based on the acceleration value stored in the storage section. The acceleration value difference calculation section, when the acceleration value increase/decrease direction has inverted, calculates a difference between at least two acceleration values obtained immediately before the inversion. The game processing section, when the difference calculated by the acceleration value difference calculation section is equal to or greater than a predetermined value, executes first game processing; and when the difference calculated by the acceleration value difference calculation section is smaller than the predetermined value, executes second game processing which is different from the first game processing.

In an eighth aspect based on the seventh aspect, the increase/decrease inversion detection section includes a first inversion detection section (30) for detecting that the acceleration value increase/decrease direction has inverted from a first direction to a second direction; and a second inversion detection section (30) for, after the first inversion detection section detects the inversion, detecting that the acceleration value increase/decrease direction has inverted from the second first direction to the first direction. When second inversion detection section detects that the inversion, the acceleration value difference calculation section calculates a difference between at least two acceleration values obtained immediately before the inversion.

According to the first aspect, it is determined whether or not the operation of interest is an operation of applying an impact to an input device, based on the difference in the acceleration value when the acceleration value increase/decrease direction is inverted. Therefore, it can be accurately detected whether or not the operation of interest is an operation of applying an impact to an input device.

According to the second aspect, like the first aspect, it can be accurately detected whether or not the operation of interest is an operation of applying an impact to an input device.

According to the third aspect, the difference in the acceleration value when the acceleration value increase/decrease direction is inverted is calculated using a plurality of types of time interval. Therefore, it can be accurately detected whether or not the operation of interest is an operation of applying an impact to an input device.

According to the fourth and fifth aspects, only when the operation of moving the input device is large to some extent, the operation can be detected as an operation of applying an impact to an input device.

According to the sixth aspect, the strength of the impact is determined based on the magnitude of the acceleration value. Therefore, even where only one type of operation of applying an impact is available, different game processing can be executed in accordance with the strength of the impact.

A game apparatus provides the same effects as those of the above-described medium having a game program stored thereon.

These and other objects, features, aspects and advantages of the present invention will become more apparent from the following detailed description of the present invention when taken in conjunction with the accompanying drawings.

DESCRIPTION OF THE PREFERRED EMBODIMENTS

The present invention will be described by way of embodiments with reference to the drawings. The present invention is not limited to the following embodiments.

Figure 1:
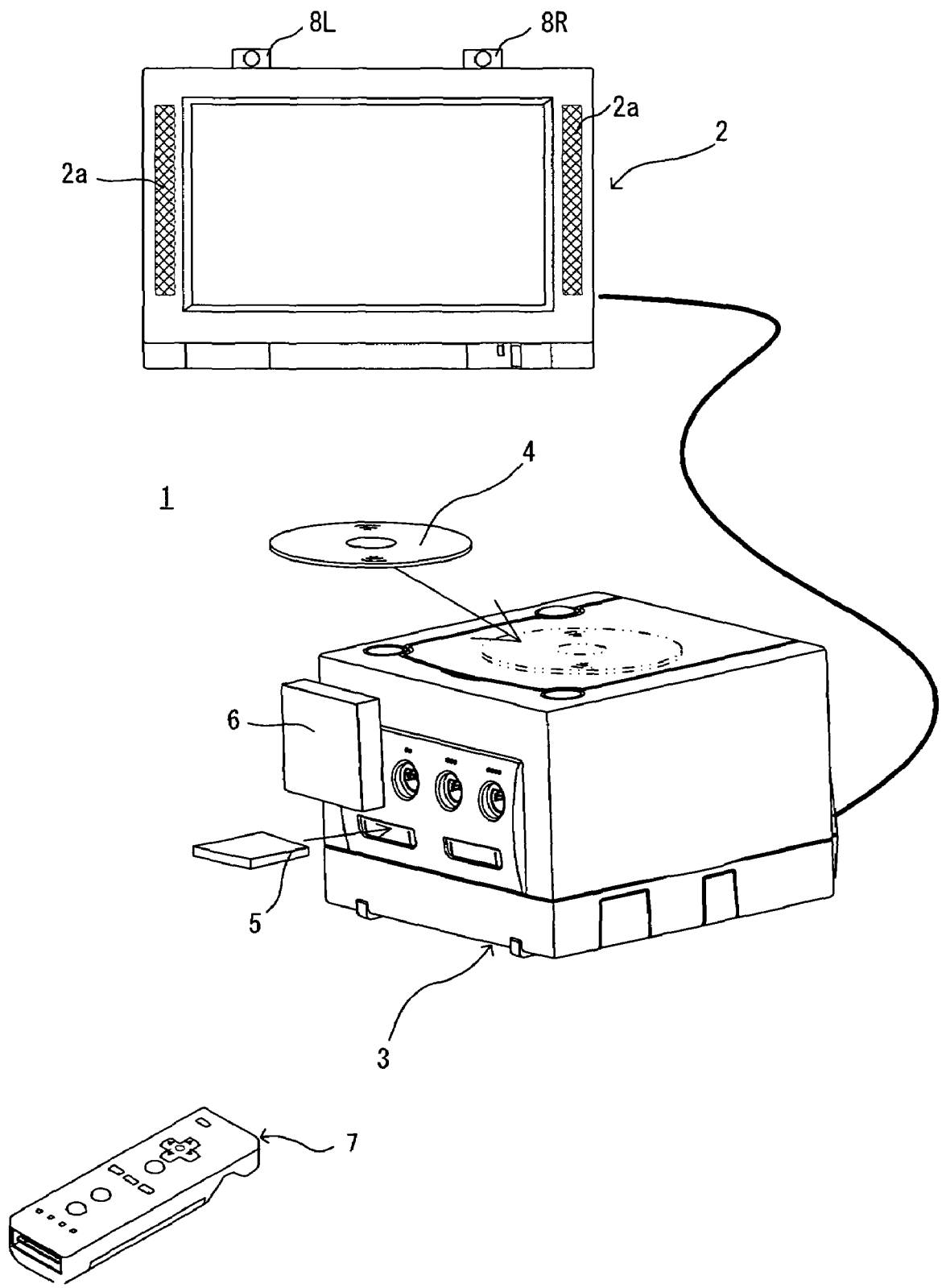
FIG. 1 is an external view of a game system 1 according to an embodiment of the present invention.

First, a game apparatus according to a first embodiment of the present invention will be described with reference to FIG. 1. Hereinafter, in order to give a specific description, a game system 1 using a game apparatus according to the present invention will be used as an example. FIG. 1 is an external view illustrating the game system 1. In the following description, the game apparatus is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker 2a via a connection cord, and a controller 7 for giving operation information to the game apparatus 3. The game apparatus 3 is connected to a receiving unit 6 via a connection terminal. The receiving unit 6 receives transmission data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 includes a power ON/OFF switch, a game processing reset switch, and an OPEN switch for opening a top lid of the game apparatus 3 on a top main surface of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. A player playing with the game apparatus 3 can enjoy the game by operating the controller 7 while watching the game image displayed on the monitor 2.

The controller 7 wirelessly transmits the transmission data from a communication section 75 included therein (described later) to the game apparatus 3 connected to the receiving unit 6, using the technology of, for example, Bluetooth (registered trademark). The controller 7 is operation means for mainly operating a player object appearing in a game space displayed on the monitor 2. The controller 7 includes an operation section having a plurality of operation buttons, a key, a stick and the like. As described later in detail, the controller 7 also includes an imaging information calculation section 74 for taking an image viewed from the controller 7. As an example of an imaging subject of the imaging information calculation section 74, two LED modules (hereinafter, referred to as "markers") 8L and 8R are provided in the vicinity of a display screen of the monitor 2. The markers 8L and 8R indicate a position of the controller 7. The markers 8L and 8R each output infrared light forward from the monitor 2.

Figure 2:
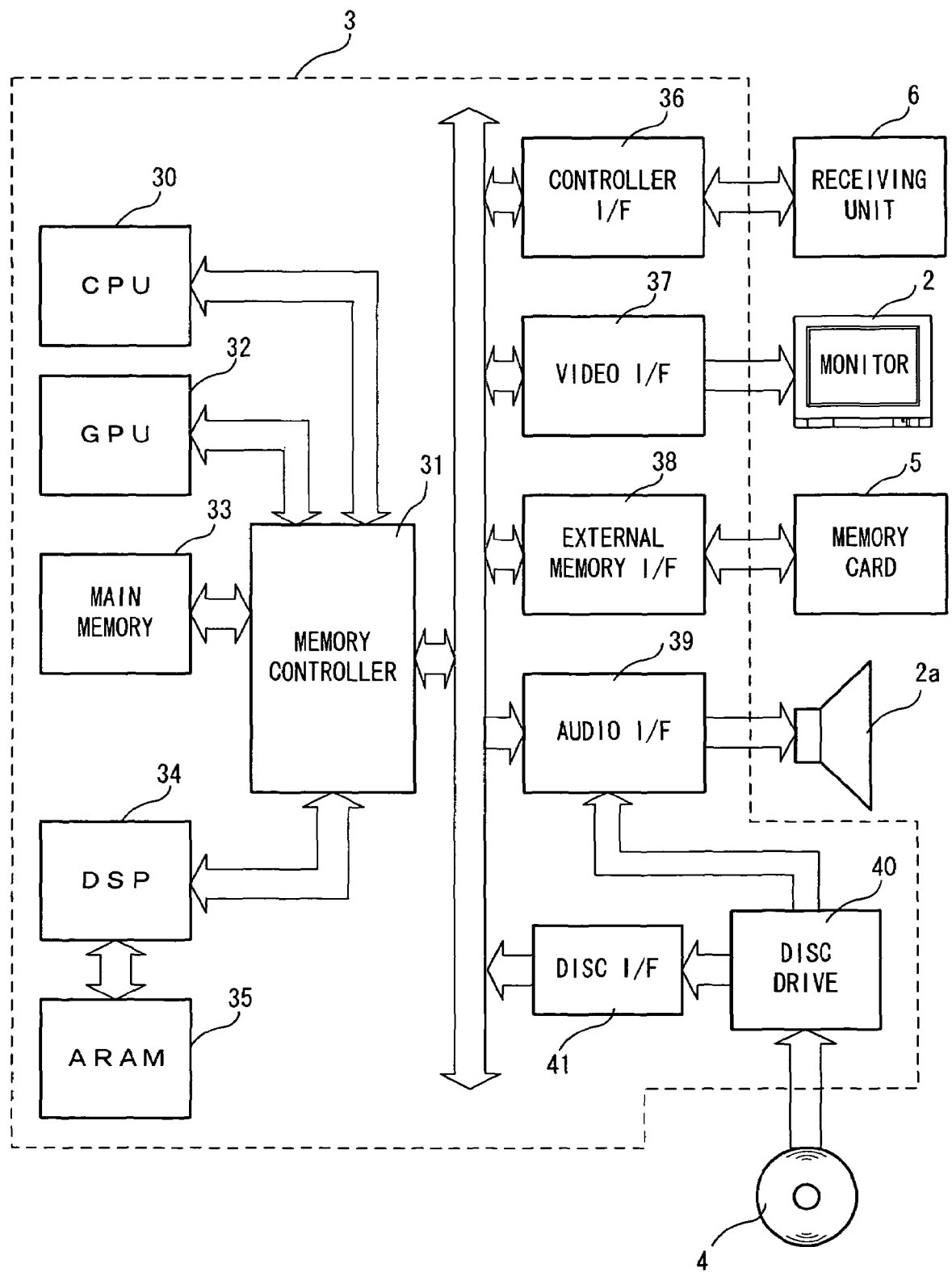
FIG. 2 is a functional block diagram of a game apparatus 3 shown in FIG. 1.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 30 for executing various types of programs. The CPU 30 executes a start program stored in a boot ROM (not shown) to, for example, initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, and an ARAM (Audio RAM) 35 via a memory controller 31. The memory controller 31 is connected to a controller I/F (interface) 36, a video I/F 37, an external memory I/F 38, an audio I/F 39, and a disc I/F 41 via a predetermined bus. The controller I/F 36, the video I/F 37, the external memory I/F 38, the audio I/F 39 and the disc I/F 41 are respectively connected to the receiving unit 6, the monitor 2, the external memory card 5, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) and a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program read from the optical disc 4 by the CPU 30, various types of data or the like. The game program, the various types of data or the like stored in the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (for example, storage of the game program or sound data already read). The DSP 34 reads the sound data stored in the ARAM 35 and outputs the sound data to the speaker 2a included in the monitor 2 via the memory controller 31 and the audio I/F 39.

The memory controller 31 comprehensively controls data transfer, and is connected to the various I/Fs described above. The controller I/F 36 includes, for example, four controller I/Fs 36a through 36d, and communicably connects the game apparatus 3 to an external device which is engageable via connectors of the controller I/Fs 36a through 36d. For example, the receiving unit 6 is engaged with such a connector and is connected to the game apparatus 3 via the controller I/F 36. As described above, the receiving unit 6 receives the transmission data from the controller 7 and outputs the transmission data to the CPU 30 via the controller I/F 36. The video I/F 37 is connected to the monitor 2. The external memory I/F 38 is connected to the external memory card 5 and is accessible to a backup memory or the like provided in the external card 5. The audio I/F 39 is connected to the speaker 2a built in the monitor 2, and is connected such that the sound data read by the DSP 34 from the ARAM 35 or sound data directly output from the disc drive 40 is output from the speaker 2a. The disc I/F 41 is connected to the disc drive 40. The disc drive 40 reads data stored at a predetermined reading position of the optical disc 4 and outputs the data to a bus of the game apparatus 3 or the audio I/F 39.

Figure 3:
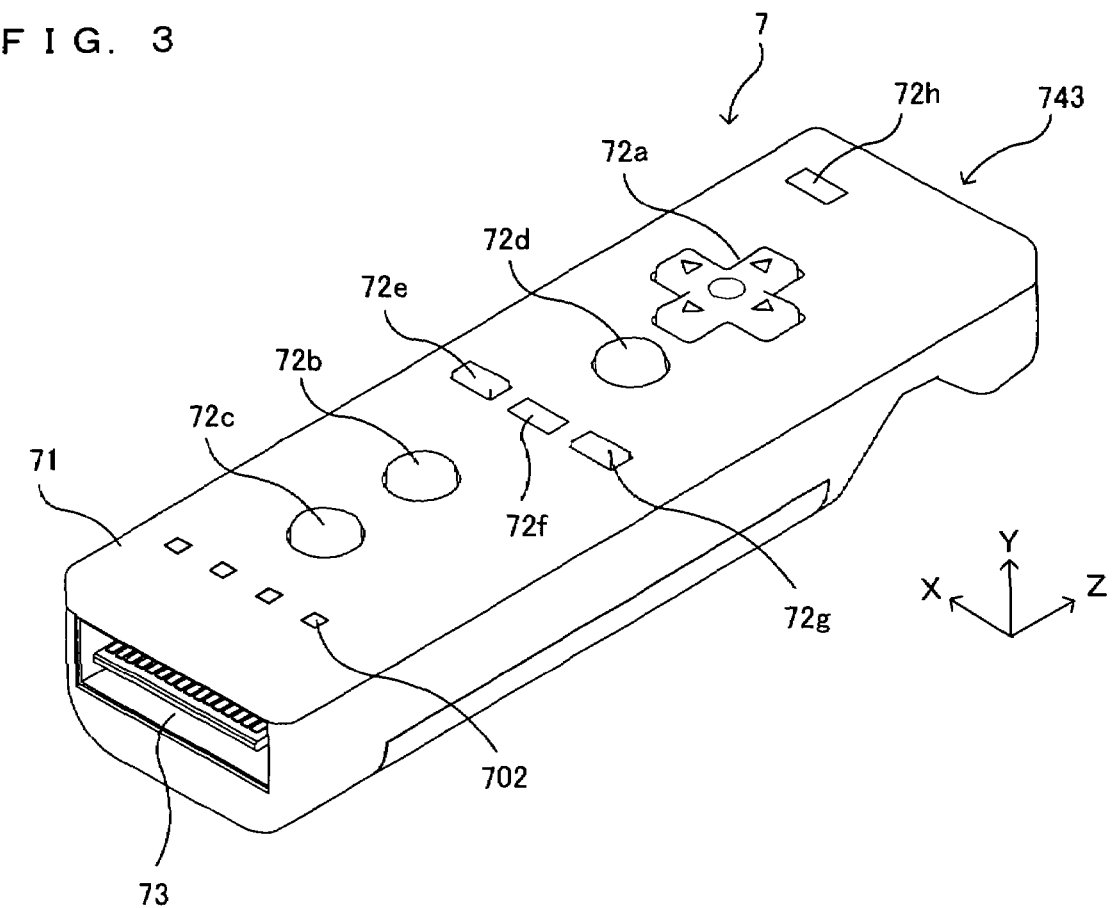
FIG. 3 is an isometric view of a controller 7 shown in FIG. 3 seen from the top rear side thereof.
Figure 4:
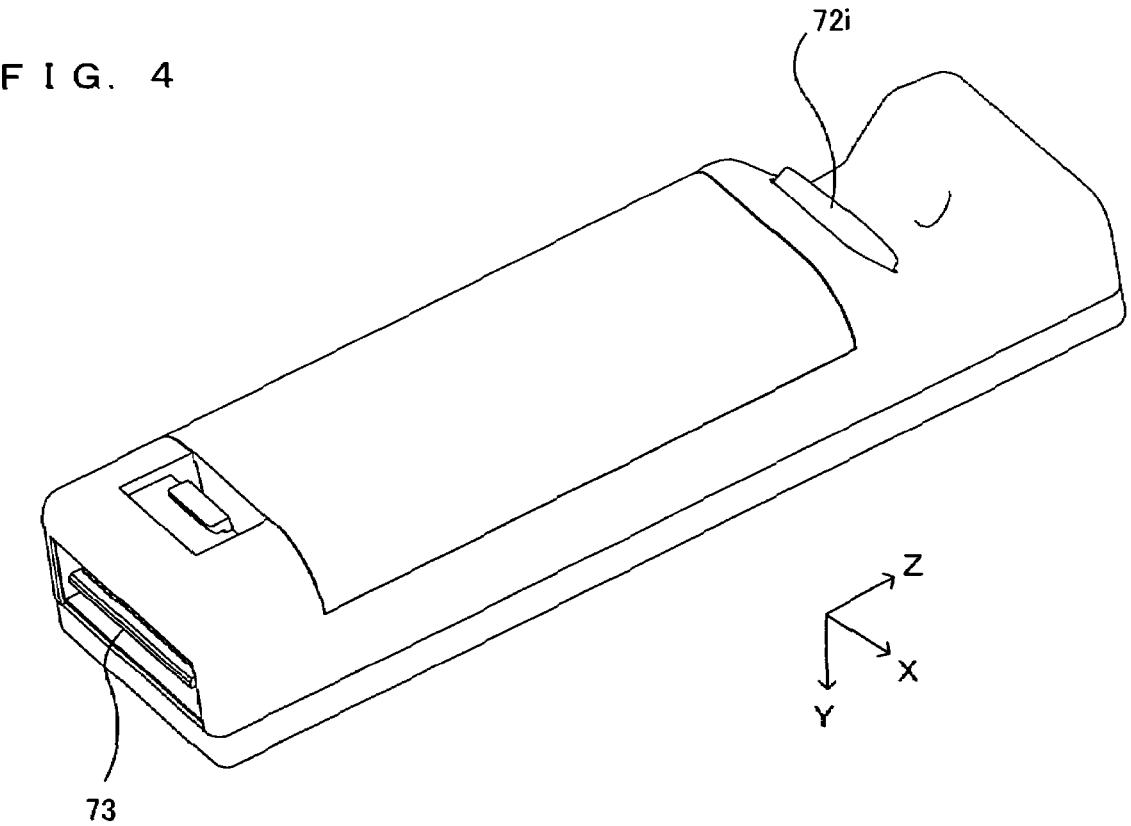
FIG. 4 is an isometric view of the controller 7 shown in FIG. 3 seen from the bottom rear side thereof.

With reference to FIG. 3 and FIG. 4, the controller 7 as an example of the input device according to the present invention will be described. FIG. 3 is an isometric view of the controller 7 seen from the top rear side thereof. FIG. 4 is an isometric view of the controller 7 seen from the bottom rear side thereof.

As shown in FIG. 3 and FIG. 4, the controller 7 includes a housing 71 formed by plastic molding or the like. The housing 71 has a plurality of operation sections 72. The housing 71 has a generally parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to the four directions represented by the arrows (front, rear, right and left), which are respectively located on cross-shaped projecting portions arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or a direction in which the cursor is to move.

The cross key 72a is an operation section for outputting an operation signal in accordance with the above-described direction input operation performed by the player, but such an operation section may be provided in another form. For example, the cross key 72a may be replaced with a composite switch including a push switch which includes a ring-shaped four-direction operation section and a center switch provided at the center thereof. Alternatively, the cross key 72a may be replaced with an operation section which includes an inclinable stick projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad. Still alternatively, the cross key 72a may be replaced with an operation section which includes switches representing at least four directions (front, rear, right and left) and outputs an operation signal in accordance with the switch pressed by the player.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of an X button, a Y button and a B button. The operation buttons 72e through 72g are assigned functions of a select switch, a menu switch and a start switch, for example. The operation buttons 72b through 72g are assigned various functions in accordance with the game program executed by the game apparatus 3, but this will not be described in detail because the functions are not directly relevant to the present invention. In an exemplary arrangement shown in FIG. 3, the operation buttons 72b through 72d are arranged in a line at the center in the front-rear direction on the top surface of the housing 71. The operation buttons 72e through 72g are arranged in a line in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he/she is using. Specifically, when the controller 7 transmits the transmission data to the receiving unit 6, one of the plurality of LEDs corresponding to the controller type is lit up.

On a bottom surface of the housing 71, a recessed portion is formed. As described later, the recessed portion is formed at a position at which an index finger or middle finger of the player is located when the player holds the controller 7. On a rear slope surface of the recessed portion, an operation button 72i is provided. The operation button 72i is an operation section acting as, for example, an A button. The operation button 72i is used, for example, as a trigger switch in a shooting game, or for attracting attention of a player object to a predetermined object.

On a front surface of the housing 71, an imaging element 743 (see FIG. 5B) included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. On a rear surface of the housing 71, a connector 73 is provided. The connector 73 is, for example, a 32-pin edge connector, and is used for engaging and connecting the controller 7 with a connection cable.

In order to give a specific description, a coordinate system which is set for the controller 7 will be defined. As shown in FIG. 3 and FIG. 4, X-, Y- and Z-axis directions perpendicular to one another are defined for the controller 7. Specifically, the longitudinal direction of the housing 71, i.e., the front-rear direction of the controller 7, is set as a Z-axis direction. A direction toward the front surface of the controller 7 (the surface having the imaging information calculation section 74) is set as a positive Z-axis direction. The up-to-down direction of the controller 7 is set as a Y-axis direction. A direction toward the top surface of the controller housing 71 (the surface having the cross key 72a and the like) is set as a positive Y-axis direction. The left-right direction of the controller 7 is set as an X-axis direction. A direction toward a left surface of the housing 71 (the surface which is not shown in FIG. 3 but is shown in FIG. 4) is set as a positive X-axis direction.

Figure 5A:
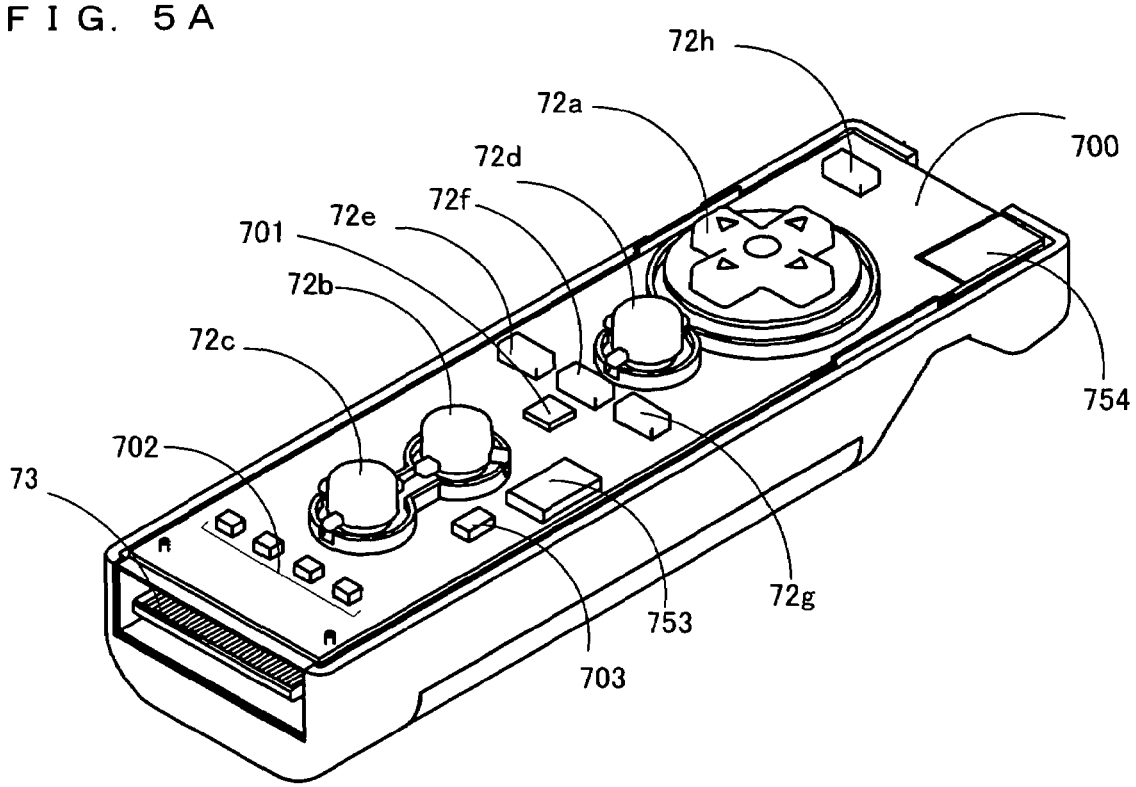
FIG. 5A is an isometric view of the controller 7 shown in FIG. 3 in the state where an upper casing is removed.
Figure 5B:
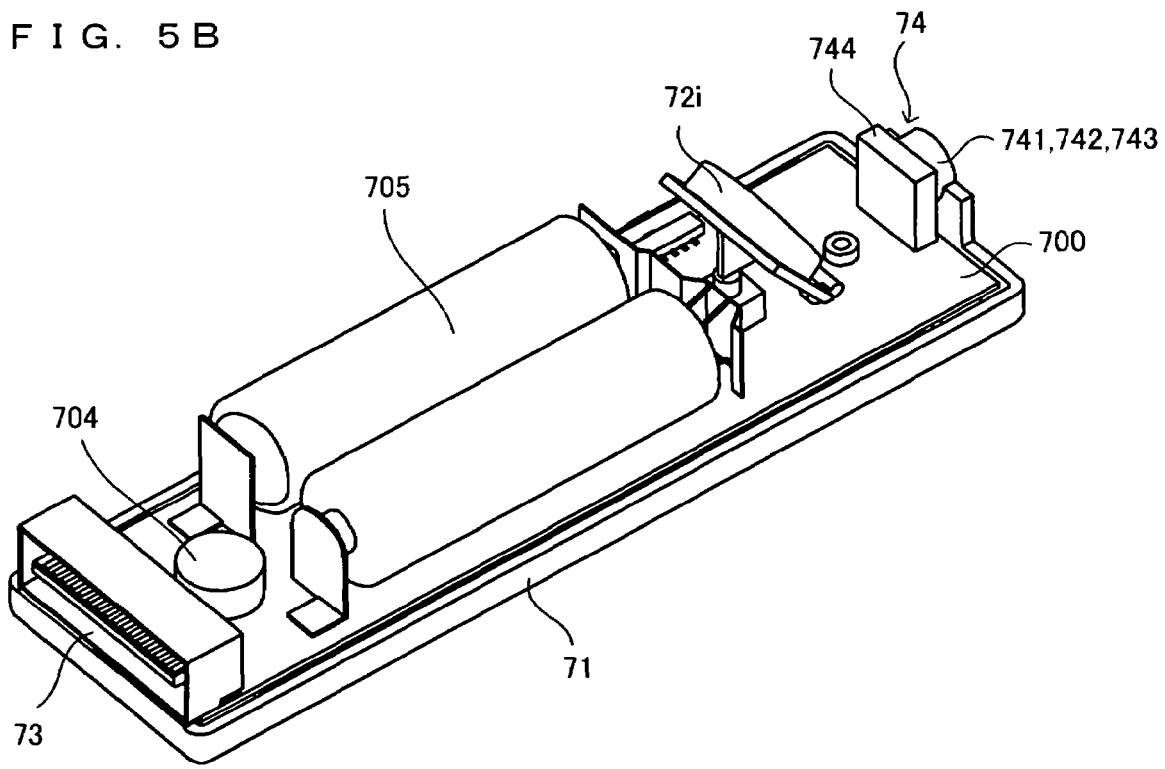
FIG. 5B is an isometric view of the controller 7 shown in FIG. 3 in the state where a lower casing is removed.

With reference to FIG. 5A and FIG. 5B, an internal structure of the controller 7 will be described. FIG. 5A is an isometric view illustrating a state where an upper casing (a part of the housing 71) of the controller 7 is removed. FIG. 5B is an isometric view illustrating a state where a lower casing (a part of the housing 71) of the controller 7 is removed. FIG. 5B shows a reverse side of a substrate 700 shown in FIG. 5A.

As shown in FIG. 5A, the substrate 700 is fixed inside the housing 71. On a top main surface of the substrate 700, the operation buttons 72a through 72h, an acceleration sensor 701, the LEDs 702, a quartz oscillator 703, a wireless module 753, an antenna 754 and the like are provided. These elements are connected to a microcomputer 751 (see FIG. 6) via lines (not shown) formed on the substrate 700 and the like. The acceleration sensor 701 detects and outputs the acceleration which is usable for calculating the inclination, vibration or the like in a three-dimensional space in which the controller 7 is present.

Figure 6:
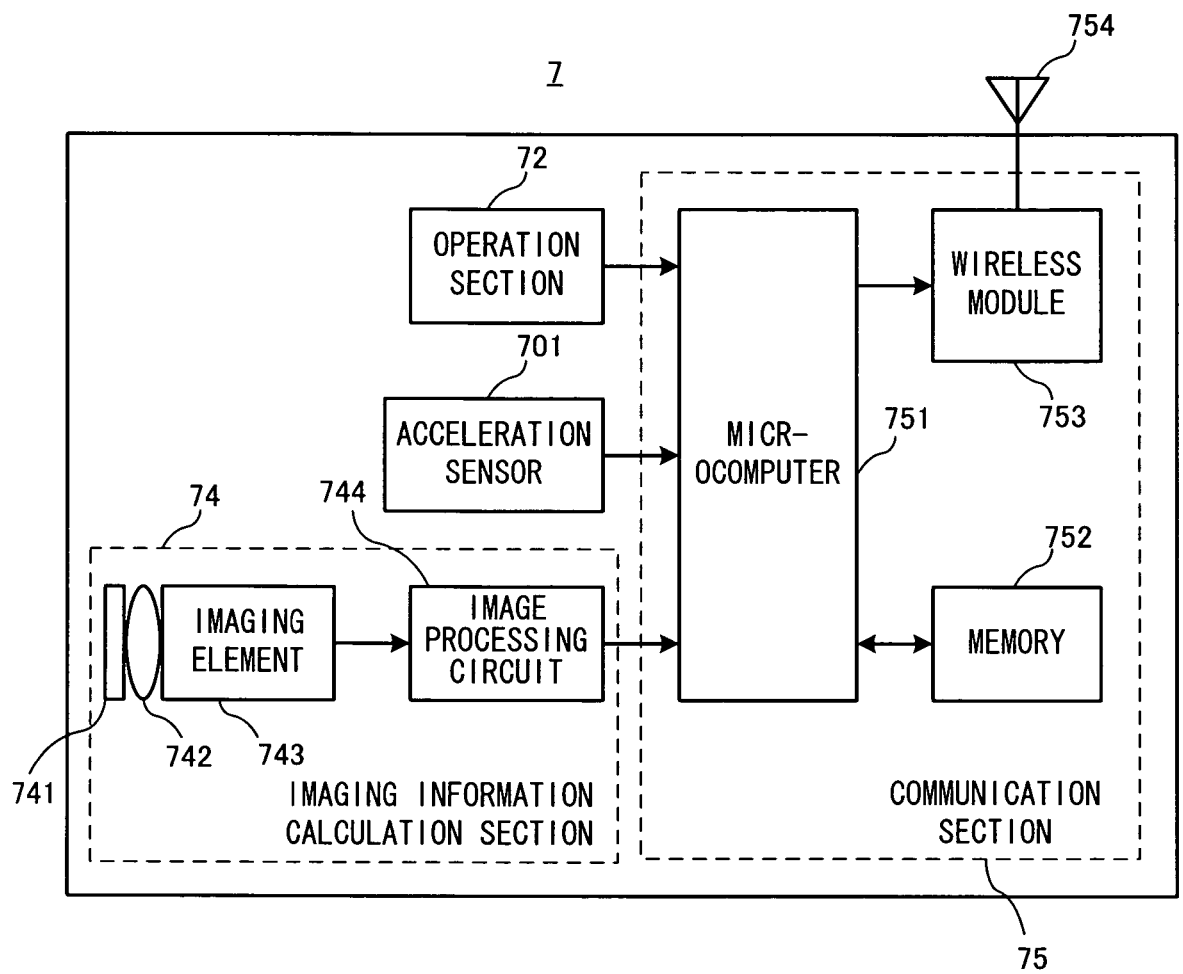
FIG. 6 is a block diagram illustrating a structure of the controller 7 shown in FIG. 3.

In more detail, the acceleration sensor 701 included in the controller 7 as shown in FIG. 6 is preferably a three-axial acceleration sensor. The three-axial acceleration sensor 701 detects a linear acceleration in three directions, i.e., an up-down direction (Y-axis direction shown in FIG. 3), a left-right direction (X-axis direction shown in FIG. 3), and a front-rear direction (Z-axis direction shown in FIG. 3). In another embodiment, two-axial acceleration detection means for detecting a linear acceleration in only X-axis and Y-axis directions (or directions along another pair of axes) may be used depending on the type of control signals used for game processing. For example, such a three-axial or two-axial acceleration sensor 701 may be available from Analog Devices, Inc. or STMicroelectroincs N.V. The acceleration sensor 701 is preferably of a static capacitance coupling system based on the technology of MEMS (Micro Electro Mechanical Systems) provided by silicon precision processing. Alternatively, the three-axial or two-axial acceleration sensor 701 may be based on an existing acceleration detection technology (for example, piezoelectric system or piezoelectric resistance system) or any other appropriate technology developed in the future.

As known to those skilled in the art, the acceleration detection means used for the acceleration sensor 701 can detect only an acceleration along a straight line corresponding to each of the axes of the acceleration sensor 701 (linear acceleration) Namely, a direct output from the acceleration sensor 701 is a signal indicating the linear acceleration (static or dynamic) along each of two or three axes thereof. Hence, the acceleration sensor 701 cannot directly detect a physical property such as, for example, a motion along an on linear path (for example, an arc path), rotation, revolution, angular displacement, inclination, position or posture.

Nonetheless, those skilled in the art would easily understand from the description of this specification that further information on the controller 7 can be estimated or calculated (determined) by executing additional processing on an acceleration signal which is output from the acceleration sensor 701. For example, when a static acceleration (gravitational acceleration) is detected, an inclination of the object (controller 7) with respect to the gravitational vector can be determined by performing calculations based on the inclination angle and the detected acceleration using the output from the acceleration sensor 701. By combining the acceleration sensor 701 with the microcomputer 751 (or another processor) in this manner, the inclination, posture or position of the controller 7 can be determined. Similarly, when the controller 7 including the acceleration sensor 701 is dynamically accelerated by a hand of the user as described later, various motions and/or position of the controller 7 can be calculated by processing an acceleration signal generated by the acceleration sensor 701. In another embodiment, the acceleration sensor 701 may include a built-in signal processing device, or another type of dedicated processing device, for executing desired processing on an acceleration signal which is output from the built-in acceleration detection means before the signal is output to the microcomputer 751. For example, when the acceleration sensor 701 is for detecting a static acceleration (for example, a gravitational acceleration), the built-in or dedicated processing device may convert the detected acceleration signal to a corresponding inclination angle (or another preferable parameter).

The communication section 75 including the wireless module 753 and the antenna 754 allows the controller 7 to act as a wireless controller. The quartz oscillator 703 generates a reference clock of the microcomputer 751 described later.

As shown in FIG. 5B, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. The operation button 72i is attached on the bottom main surface of the substrate 700 rearward to the image information calculation section 74, and cells 705 are accommodated rearward to the operation button 72i. On the bottom main surface of the substrate 700 between the cells 705 and the connector 73, a vibrator 704 is attached. The vibrator 704 may be, for example, a vibration motor or a solenoid. The controller 7 is vibrated by an actuation of the vibrator 704, and the vibration is conveyed to the player holding the controller 7. Thus, a so-called vibration-responsive game is realized.

With reference to FIG. 6, the internal structure of the controller 7 will be described. FIG. 6 is a block diagram showing the structure of the controller 7.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The markers 8L and 8R provided in the vicinity of the display screen of the monitor 2 are LEDs for outputting infrared light forward from the monitor 2. Therefore, the provision of the infrared filter 741 allows an image of the markers 8L and 8R to be taken more accurately. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 and generates image data. The image data generated by the imaging element 743 is processed by the image processing circuit 744. Specifically, the image processing circuit 744 processes the image data obtained from the imaging element 743 (images of the markers 8L and 8R), detects an area thereof having a high brightness, and outputs processing result data representing the coordinate set of the detected position and the size of the area to the communication section 75. The imaging information calculation section 74 is fixed to the housing 71 of the controller 7. The imaging direction of the imaging information calculation section 74 can be changed by changing the direction of the housing 71. Based on the processing result data which is output from the imaging information calculation section 74, a signal in accordance with the position or motion of the controller 7 is obtained. Based on the signal, an input coordinate set based on the coordinate system of the screen of the monitor 2 is obtained. Namely, the controller 7 acts as a pointing device because of the processing result data which is output from the imaging information calculation section 74.

As described above, the acceleration sensor 701 detects and outputs an acceleration in the form of components of three axial directions of the controller 7, i.e., the components of the up-down direction (Y-axis direction), the left-right direction (X-axis direction), and the front-rear direction (the Z-axis direction) of the controller 7. Data representing the acceleration as each of the components of the three axial directions detected by the acceleration sensor 701 is output to the communication section 75. Based on the acceleration data which is output from the acceleration sensor 701, a motion of the controller 7 can be detected. As the acceleration sensor 701, a sensor for detecting an acceleration in two of the three axial directions may be used in accordance with data required for a specific application.

The communication section 75 includes the microcomputer 751, a memory 752, the wireless module 753 and the antenna 754. The microcomputer 751 controls the wireless module 753 for transmitting the transmission data while using the memory 752 as a storage area during processing.

Data from the controller 7 including an operation signal (key data) from the operation section 72, acceleration signals in the three axial directions (X-axis, Y-axis and Z-axis direction acceleration data) from the acceleration sensor 701, and the processing result data from the imaging information calculation section 74 are output to the microcomputer 751. The microcomputer 751 temporarily stores the input data (key data, X-axis, Y-axis and Z-axis direction acceleration data, and the processing result data) in the memory 752 as the transmission data which is to be transmitted to the receiving unit 6. The wireless transmission from the communication section 75 to the receiving unit 6 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is 5 ms. At the transmission timing to the receiving unit 6, the microcomputer 751 outputs the transmission data stored in the memory 752 as a series of operation information to the wireless module 753. The wireless module 753 uses, for example, the Bluetooth (registered trademark) technology to radiate the operation information from the antenna 754 as a carrier wave signal of a predetermined frequency. Thus, the key data from the operation section 72, the X-axis, Y-axis and Z-axis direction acceleration data from the acceleration sensor 701, and the processing result data from the imaging information calculation section 74 are transmitted from the controller 7. The receiving unit 6 of the game apparatus 3 receives the carrier wave signal, and the game apparatus 3 demodulates or decodes the carrier wave signal to obtain the series of operation information (the key data, the X-axis, Y-axis and Z-axis direction acceleration data, and the processing result data). Based on the obtained operation information and the game program, the CPU 30 of the game apparatus 3 performs the game processing. In the case where the communication section 75 is structured using the Bluetooth (registered trademark) technology, the communication section 75 can have a function of receiving transmission data which is wirelessly transmitted from other devices.

With reference to FIG. 7 through FIG. 14, an overview of a game playable in this embodiment will be described.

Figure 7:
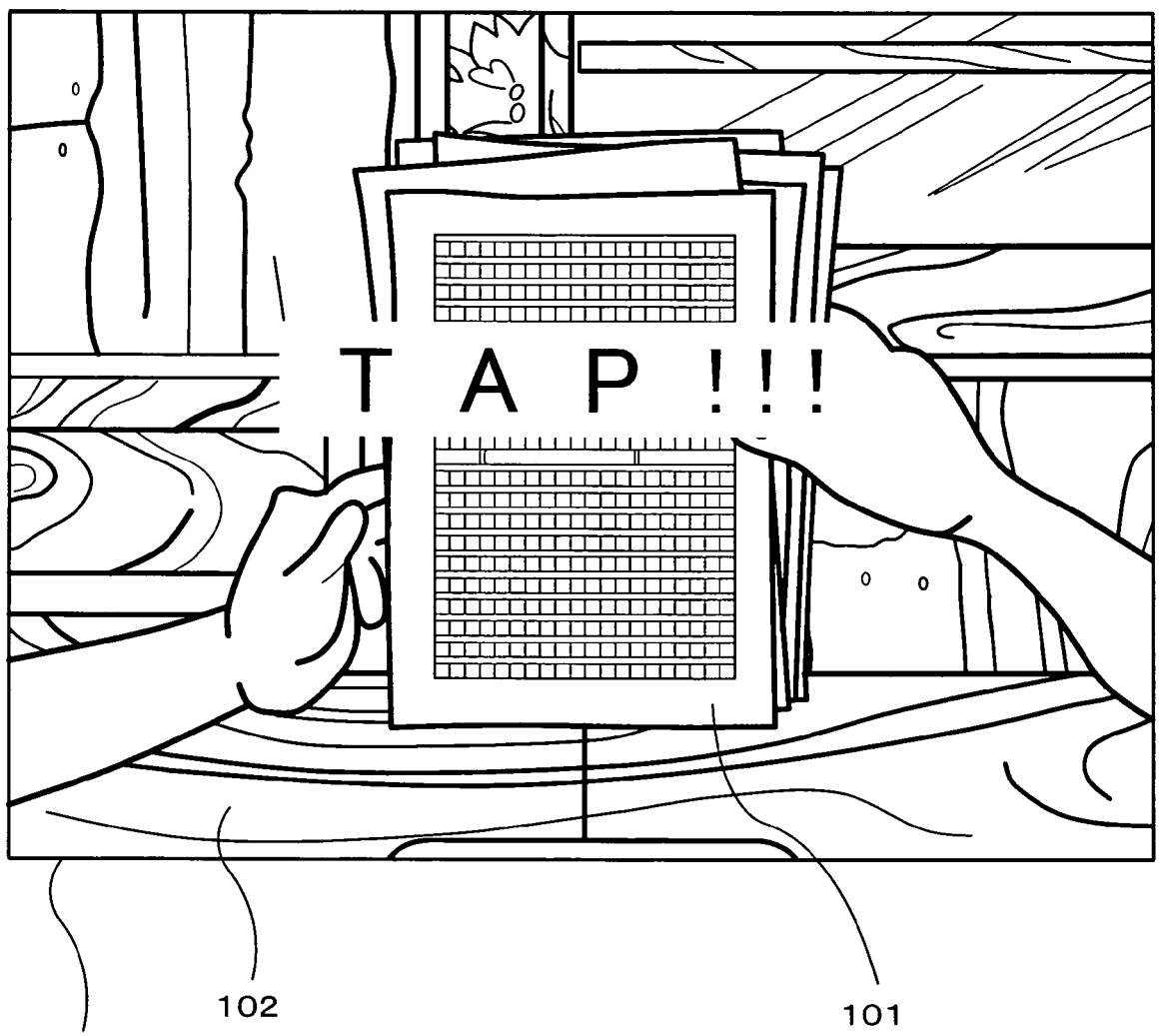
FIG. 7 shows an exemplary game image of a game playable in the embodiment.
Figure 8:
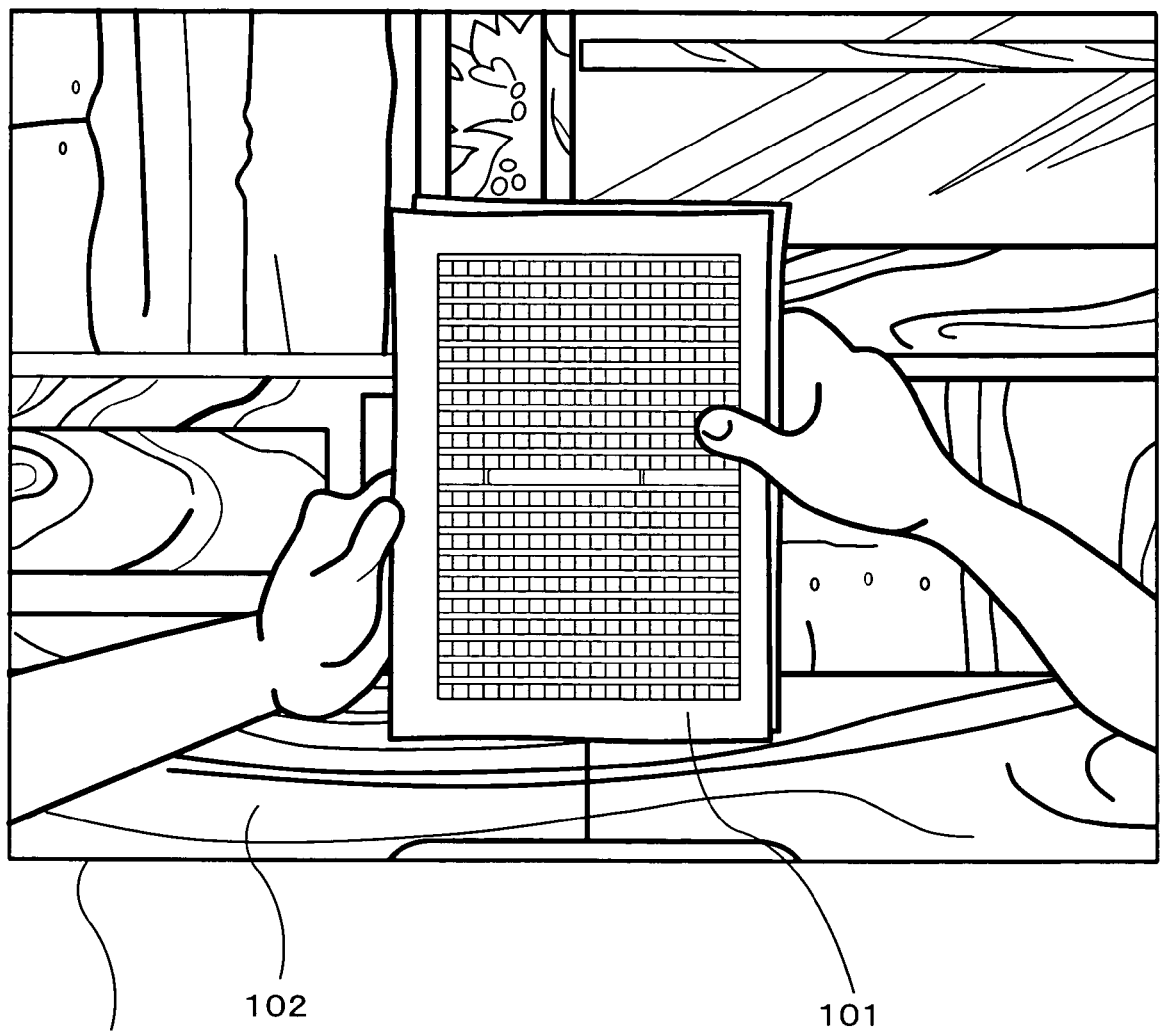
FIG. 8 shows another exemplary game image of the game playable in the embodiment.
Figure 9:
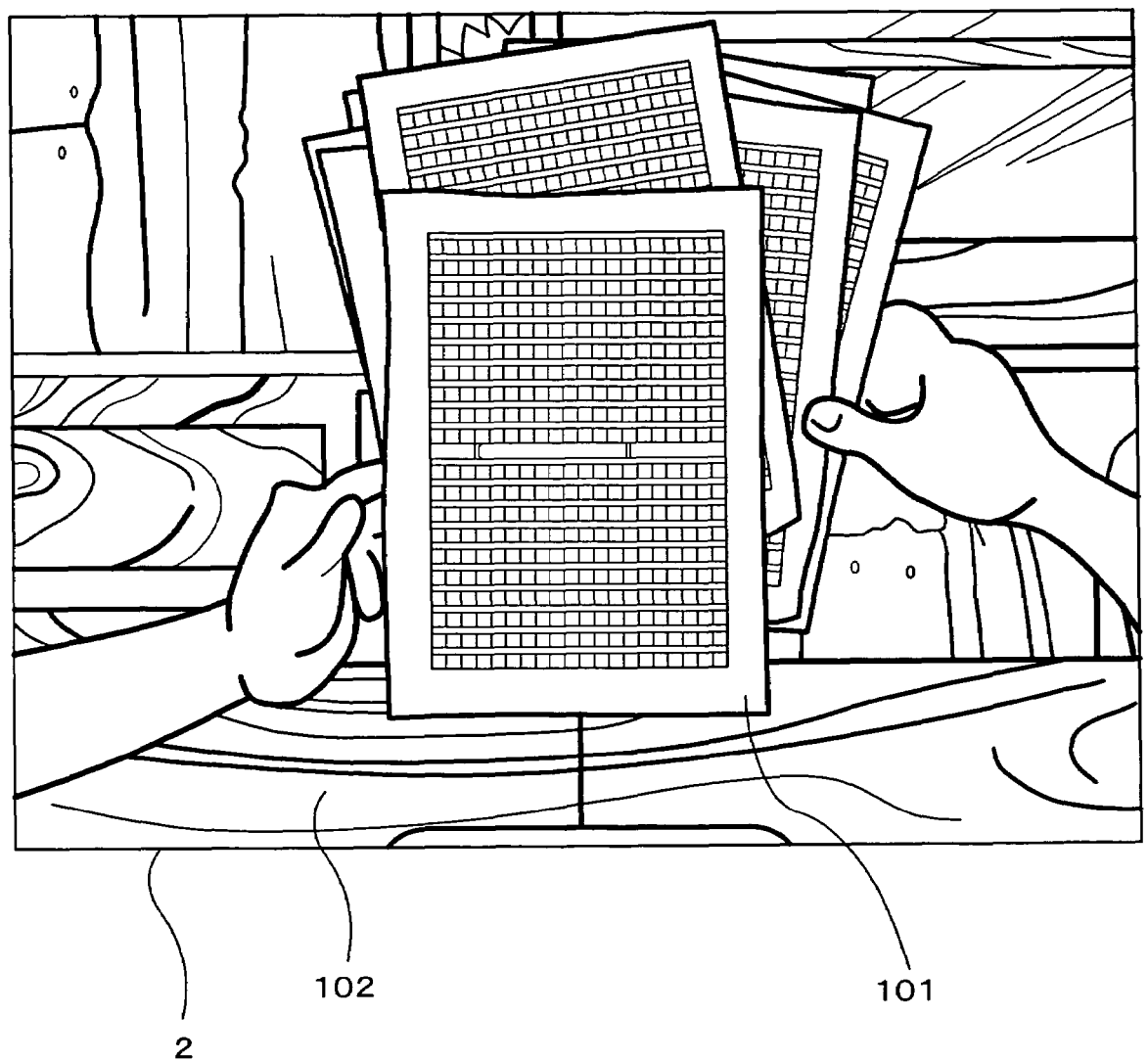
FIG. 9 shows still another exemplary game image of the game playable in the embodiment.
Figure 10:
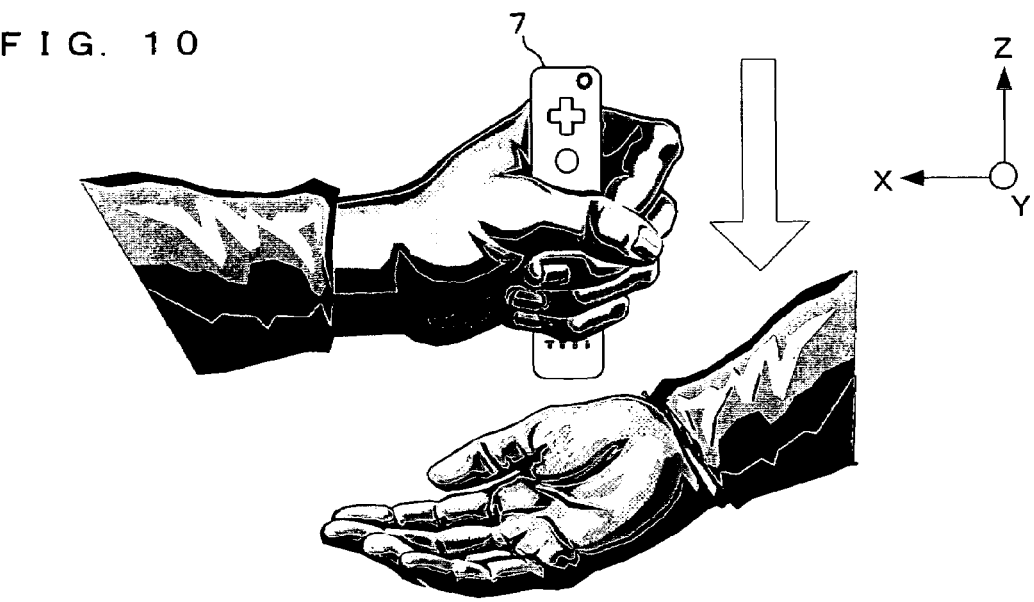
FIG. 10 shows how to play the game playable in the embodiment.
Figure 11:
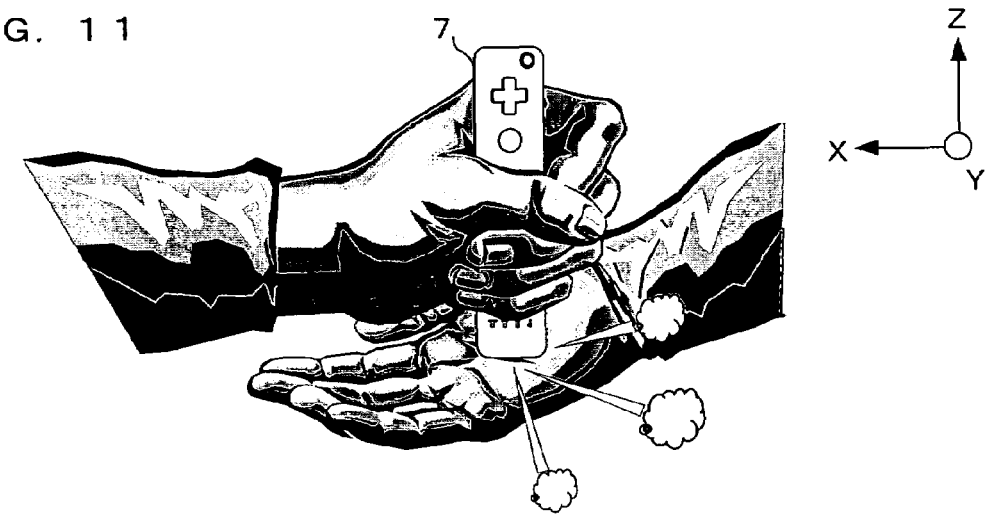
FIG. 11 shows how to play the game playable in the embodiment.
Figure 12:
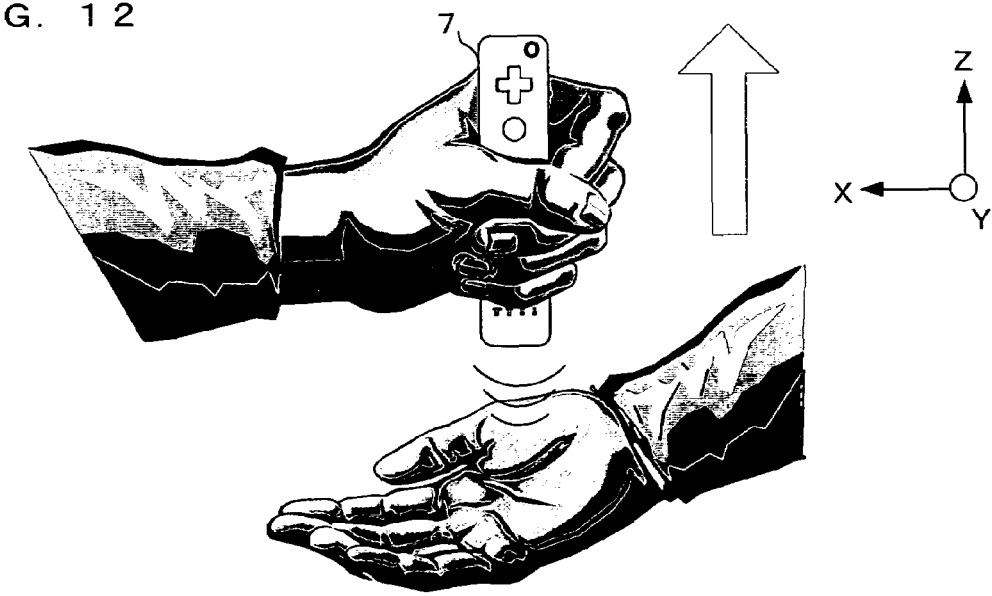
FIG. 12 shows how to play the game playable in the embodiment.

FIG. 7 through FIG. 9 each show an exemplary game image of a game playable in this embodiment. As shown in FIG. 7, the monitor 2 shows a plurality of writing sheets 101 and a desk object 102. The game playable in this embodiment is to align the paper sheets 101 within a time limit. As an aligning operation, as shown in FIG. 10 through FIG. 12, the player holds the controller 7 so that the Z-axis direction of the controller 7 is substantially vertical and taps the tip of the controller 7 on his/her palm (or a desk) (operation of applying an impact to the controller 7). (The player repeats the series of motions shown in FIG. 10 through FIG. 12.) In association with the motions, the writing sheets 101 are displayed on the screen as being tapped on the desk object 102. The writing sheets 101 are gradually aligned and are finally neatly aligned as shown in FIG. 8. The game in this embodiment is to align the writing sheets 101 within a time limit by tapping the controller 7 on the palm a plurality of times.

Figure 13:
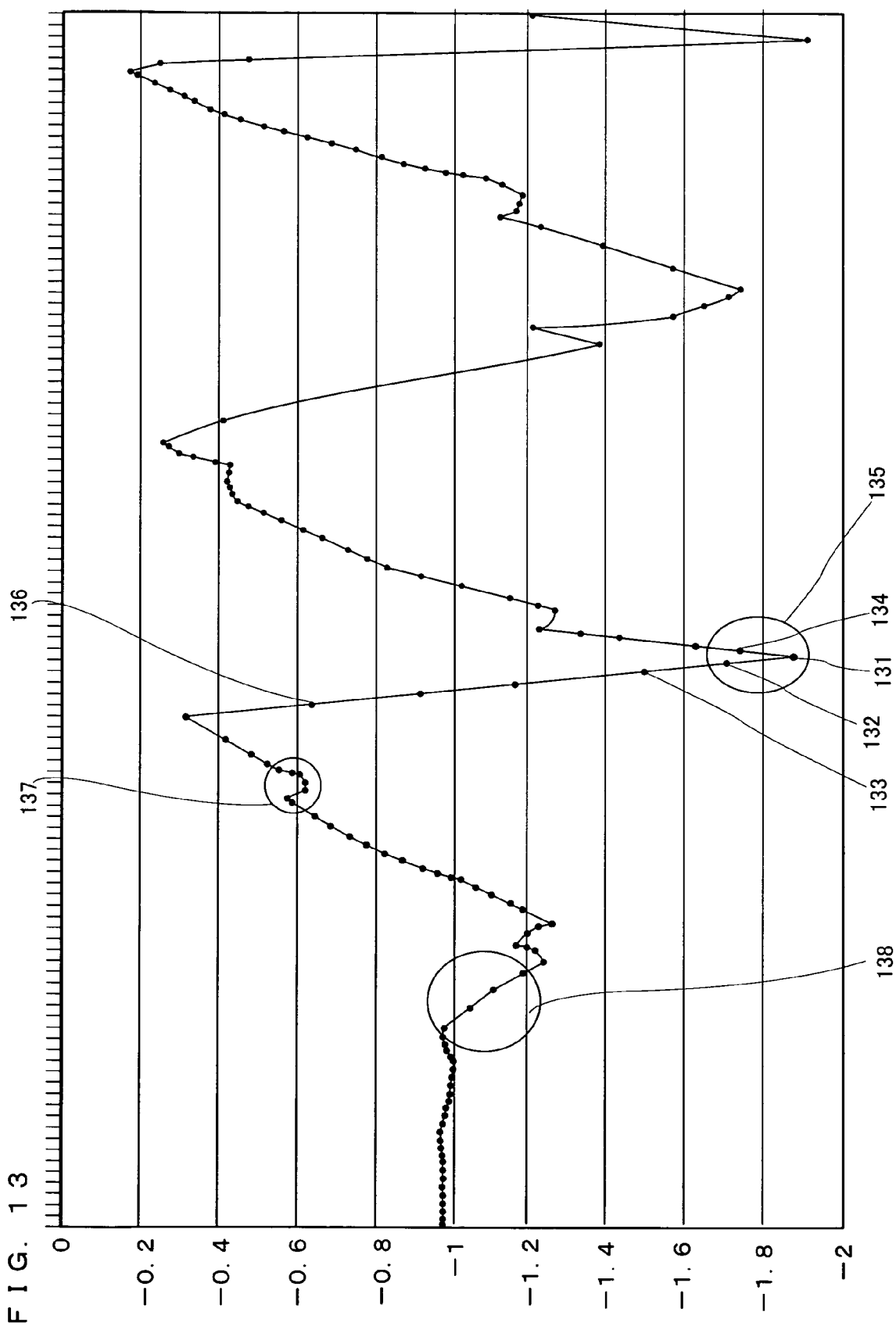
FIG. 13 is a graph illustrating an example of a change in the acceleration value in a tapping operation.
Figure 14:
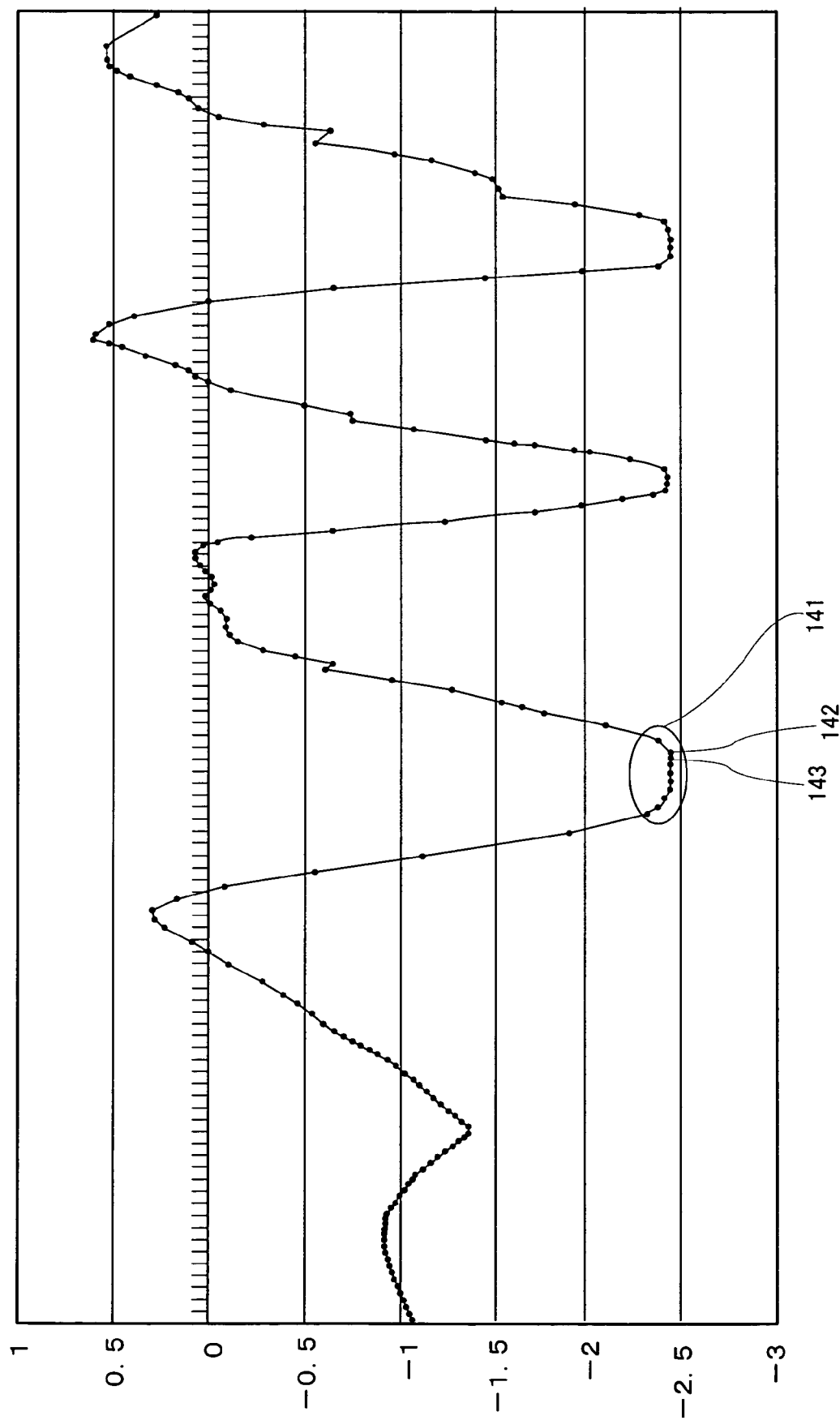
FIG. 14 is a graph illustrating an example of a change in the acceleration value when the controller 7 is swung up and down in the air.

Next, the principle of the processing executed in this embodiment, specifically the principle of detecting the operation of tapping the controller 7 on the palm (hereinafter, referred to as a "tapping operation") will be described. As described above, the controller 7 includes the acceleration sensor 701. The tapping operation is detected, using the characteristics of a change in the acceleration value during the tapping operation. In this embodiment, the game processing is executed using the acceleration value in the Z-axis direction obtained by the acceleration sensor 701. Therefore, in the following description, the term "acceleration value" refers to an "acceleration value in the Z-axis direction". FIG. 13 is a graph illustrating an exemplary change in the acceleration value during the tapping operation. FIG. 14 is a graph illustrating an exemplary change in the acceleration value obtained when the controller 7 is simply swung in the air, instead of the controller 7 being tapped on the palm. In FIG. 13 and FIG. 14, the horizontal axis represents time (number of frames), and the vertical axis represents the acceleration value.

The acceleration direction and the direction in which the acceleration value changes have the following relationship. In the state where the controller 7 is freely dropping, the acceleration value detected by the acceleration sensor 701 is 0. When the controller 7 stops still in the state shown in FIG. 10 (where the surface of the controller 7 having the imaging element 743 is directed upward), the acceleration value detected by the acceleration sensor 701 is −1. When the controller 7 is being accelerated upward in the vertical direction (the positive Z-axis direction; encompassing the state where the controller 7 which is moving downward in the vertical direction is decelerated), the acceleration value is smaller than −1 (as the upward acceleration is larger, the acceleration value is smaller). By contrast, when the controller 7 is being accelerated downward in the vertical direction (the negative Z-axis direction; encompassing the state where the controller 7 which is moving upward in the vertical direction is decelerated), the acceleration value is larger than −1 (as the downward acceleration is larger, the acceleration value is larger). For example, in FIG. 13, in the state where the player holds the controller 7 before performing the tapping operation (initial state), a gravitational acceleration is applied to the controller 7. Therefore, the acceleration value stays at around −1. When the player lowers the controller 7 toward his/her palm, the controller 7 is accelerated downward vertically. Therefore, the acceleration value becomes larger than 1. When the controller 7 hits the palm, the controller 7, which had been moving downward vertically, collides against the palm, stops and jumps back (i.e., is rapidly accelerated upward vertically). Therefore, the acceleration value becomes smaller than −1.

The acceleration value is applied when the direction in which the acceleration value changes (increases or decreases) (such a direction will be referred to as an "acceleration value increase/decrease direction") is inverted. Referring to the graph in FIG. 13, when the acceleration value increase/decrease direction is inverted from a negative direction (i.e., the direction in which the acceleration value decreases) to a positive direction (i.e., the direction in which the acceleration value increases) (e.g., circle 135 in FIG. 13, or circle 141 in FIG. 14), the line representing the tapping operation makes a sharp turn (circle 135) by the influence of the impact. By contrast, the line representing the swinging operation in the air makes a relatively mild curve (circle 141). An embodiment of the present invention pays attention to such a difference in the manner of change of the acceleration value when the acceleration value increase/decrease direction is inverted. The difference between the acceleration value when the acceleration value increase/decrease direction is inverted (point 131 in FIG. 13) and an acceleration value immediately previous thereto (point 132 in FIG. 13) is calculated. When the difference is equal to or greater than a predetermined value, it is determined that the tapping operation has been made (more accurately, the tapping operation has been made once).

Figure 15:
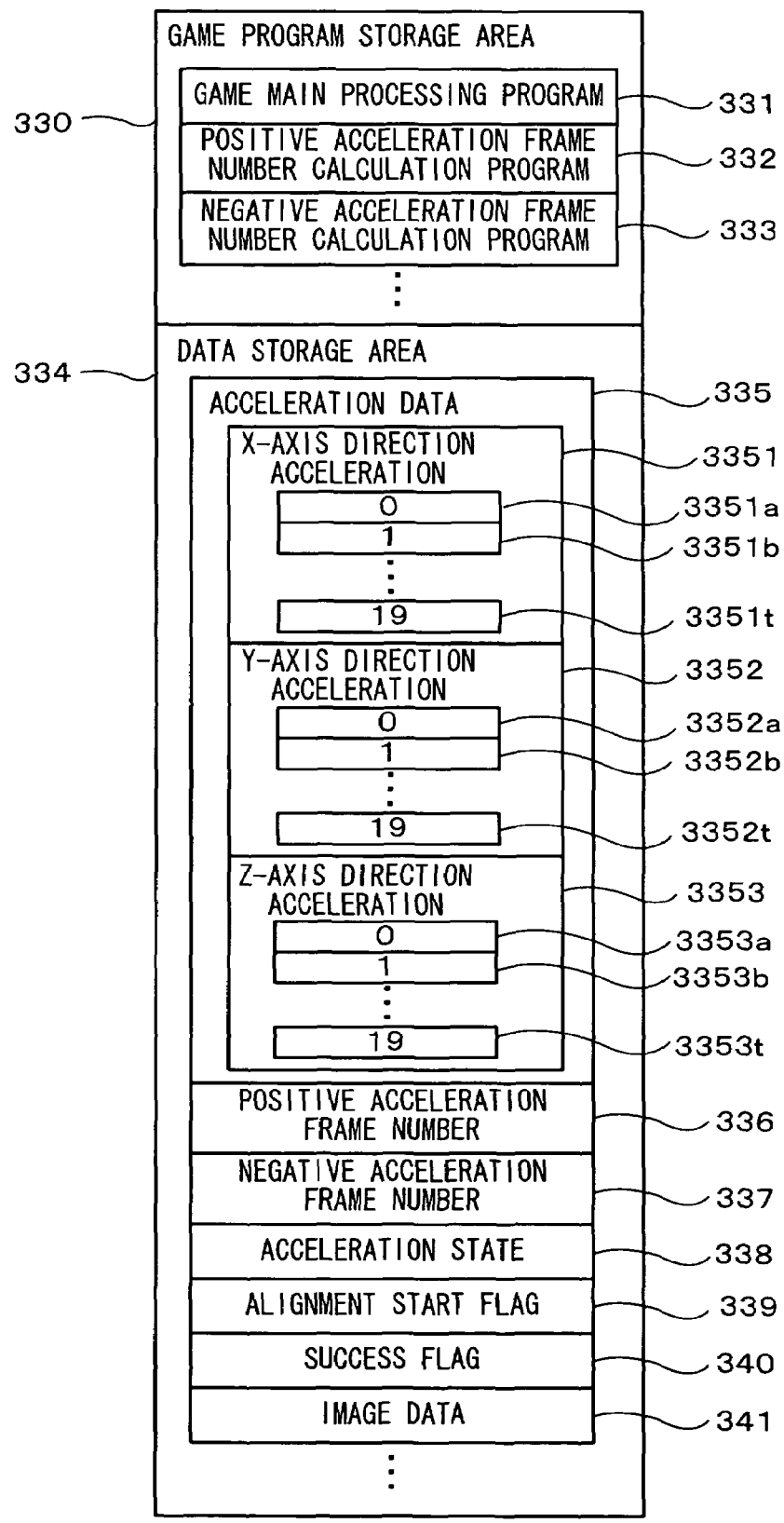
FIG. 15 shows a memory map in a main memory 33.

Next, various data used in this embodiment will be described. FIG. 15 shows a memory map of the main memory 33 shown in FIG. 2. As shown in FIG. 15, the main memory 33 includes a game program storage area 330 and a data storage area 334.

The game program storage area 330 stores a game program executed by the CPU 30. The game program includes a game main processing program 331, a positive acceleration frame number calculation program 332, a negative acceleration frame number calculation program 333 and the like.

The game main processing program 331 controls the entire processing in this embodiment. The positive acceleration frame number calculation program 332 is for a subroutine called by the game main processing program 331 for calculating the number of frames required to make a series of changes in the acceleration value in the positive direction (hereinafter, referred to as the "positive acceleration frame number"). The negative acceleration frame number calculation program 333 is for a subroutine called by the game main processing program 331 for calculating the number of frames required to make a series of changes in the acceleration value in the negative direction (hereinafter, referred to as the "negative acceleration frame number").

The data storage area 334 includes acceleration data 335, a positive acceleration frame number 336, a negative acceleration frame number 337, an acceleration state 338, an alignment start flag 339, a success flag 340, image data 341 and the like. The main memory 33 stores data on various objects appearing in the game (position data, etc.), data on a virtual game space (topography data, etc.), and other data necessary for the game processing in addition to the data shown in FIG. 15.

The acceleration data 335 is included in a series of operation information which is transmitted from the controller 7 as transmission data. The acceleration data 335 includes data detected by the acceleration sensor 701 as X, Y and Z axis components, i.e., an X-axis acceleration 3351, a Y-axis acceleration 3352, and a Z-axis acceleration 3353. As the acceleration data 335, data for the latest (newest) 20 frames (in FIG. 15, 3351$a$ through 3351$t$, 3352$a$ through 3352$t$, and 3353$a$ through 3353$t$) is stored. In the order of storage, for example, the acceleration data 3353$a$ is oldest and 3353$t$ is newest. The receiving unit 6 included in the game apparatus 3 receives the acceleration data 335 included in the operation information which is transmitted from the controller 7 at a predetermined time interval, for example, every 5 ms. The receiving unit 6 then stores the acceleration data 335 in a buffer (not shown) therein. Then, the acceleration data 335 is read at every frame, which is the game processing interval, and stored in the main memory 33 as described above. The acceleration data 335 has a value in the range of −2 G to +2 G.

The positive acceleration frame number 336 is calculated by the positive acceleration frame number calculation program 332. The positive acceleration frame number 336 represents the number of frames required to make a series of changes in the acceleration value in the positive direction. Namely, the positive acceleration frame number 336 represents the number of frames required for the player to make an operation of lowering the controller 7 toward his/her palm. (Precisely, the term in which the acceleration value changes in the positive direction does not match the term in which the player performs an operation of lowering the controller 7 toward his/her palm, and the term lengths are not the same. For the sake of simplicity, however, these terms are assumed to match each other in the following description.)

The negative acceleration frame number 337 is calculated by the negative acceleration frame number calculation program 333. The negative acceleration frame number 337 represents the number of frames required to decrease the acceleration value (i.e., to make a series of changes in the acceleration value in the negative direction). Namely, the negative acceleration frame number 337 represents the number of frames required for the player to make an operation of raising the controller 7 (farther from his/her palm). (Precisely, the term in which the acceleration value changes in the negative direction does not match the term in which the player performs an operation of raising the controller 7 away from his/her palm, and the term lengths are not the same. For the sake of simplicity, however, these terms are assumed to match each other in the following description.)

The acceleration state 338 represents the acceleration state of the controller 7. In this embodiment, the acceleration state 338 shows three states of "no acceleration" which is the initial state, "positive acceleration completion" which indicates that the player finished lowering the controller 7, and "negative acceleration completion" which indicates that the player finished raising the controller 7.

The alignment start flag 339 indicates whether or not the tapping operation has been started. This is used for avoiding incorrect detection, namely, so that a subtle movement caused by the unstable state of the hand or the like is not reflected on the game.

The success flag 340 indicates whether or not the tapping operation succeeded, i.e., whether or not the controller 7 was applied to the palm at an appropriate force (whether or not an impact appropriate to align the writing sheets was applied).

The image data 345 is on various objects appearing in the virtual game space, including the writing sheets 101 and the desk object 102.

Figure 16:
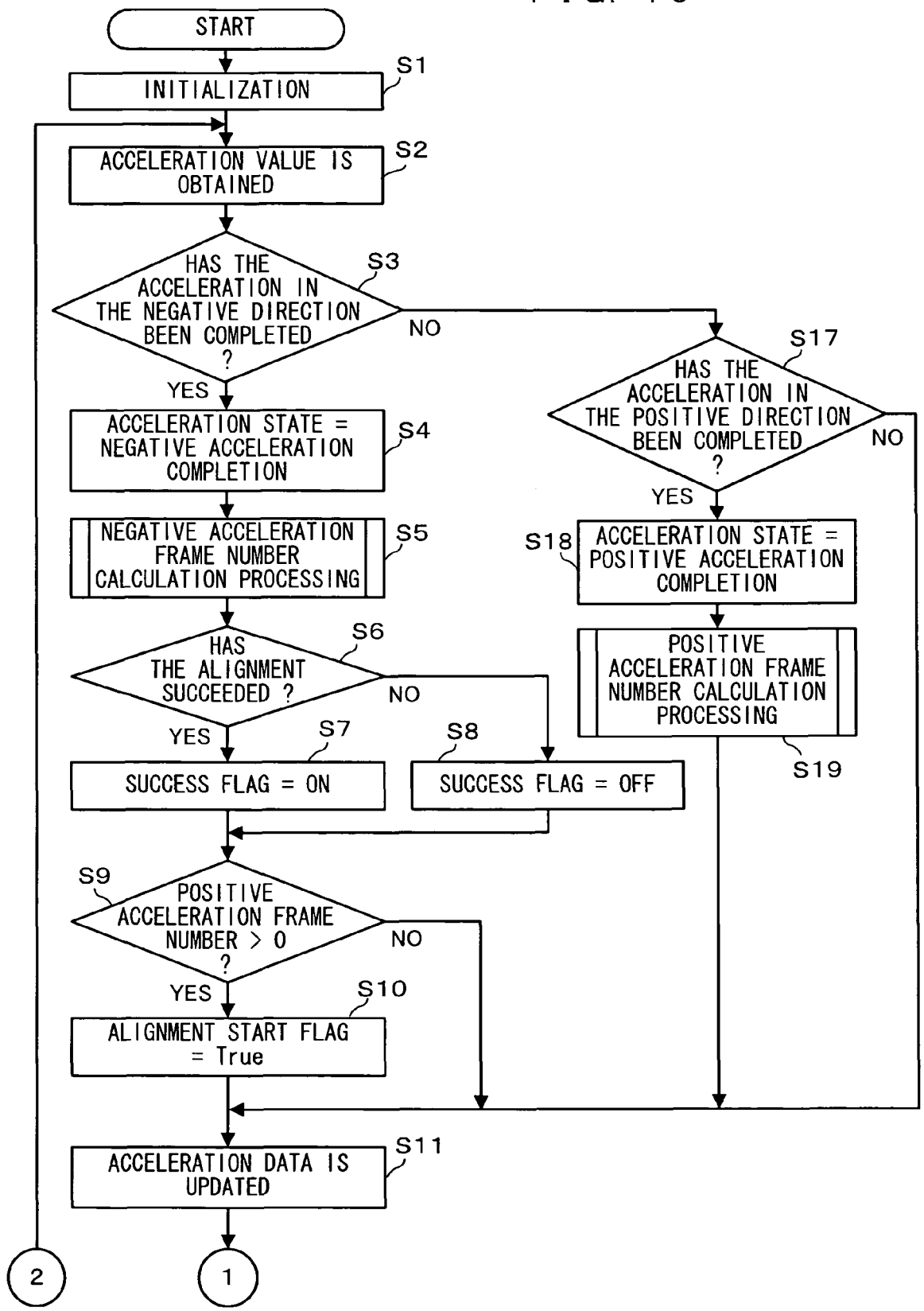
FIG. 16 is a flowchart illustrating a flow of game processing in the embodiment of the present invention.
Figure 17:
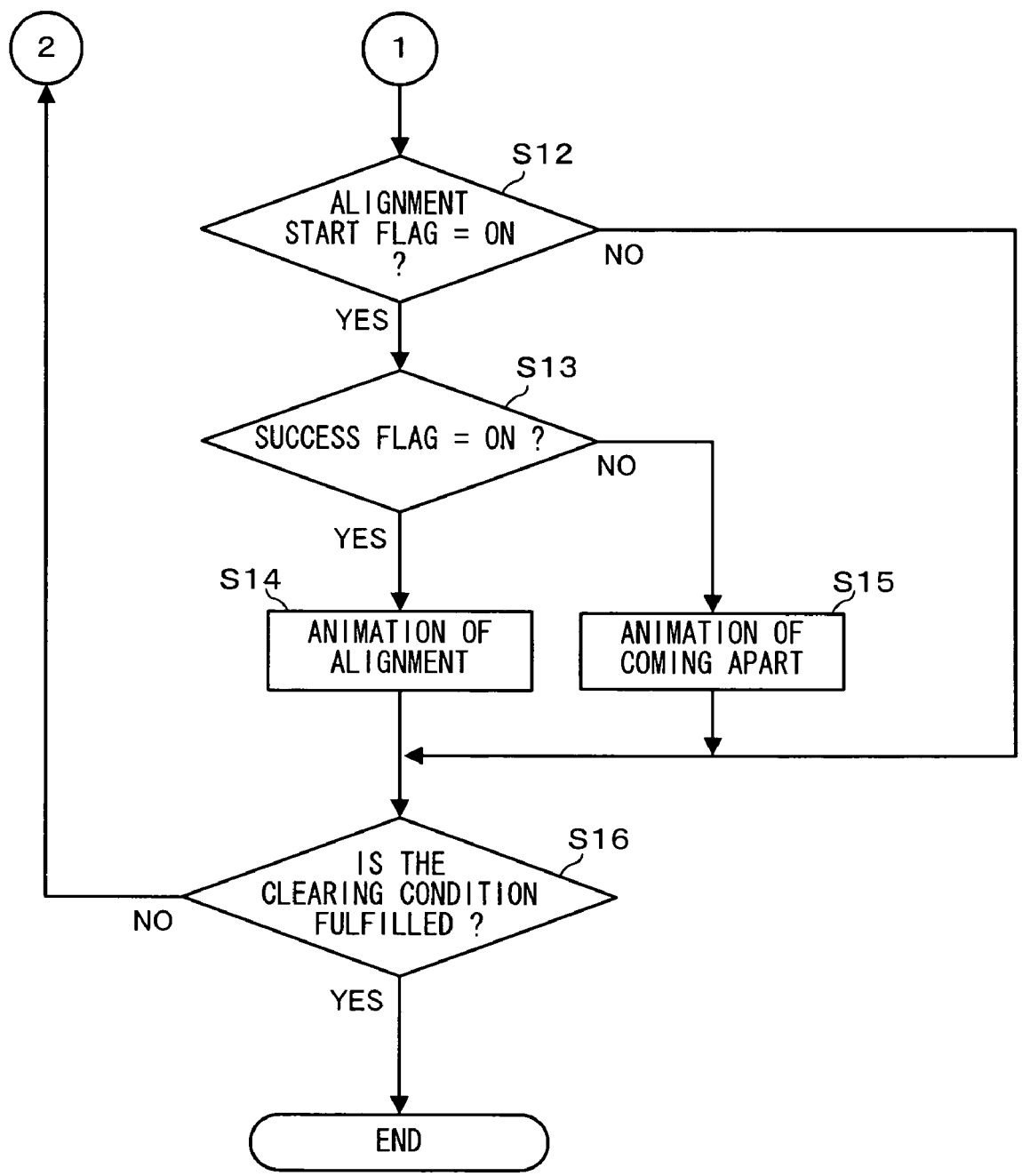
FIG. 17 is a flowchart illustrating a flow of game processing in the embodiment of the present invention.

Next, with reference to FIG. 9 through FIG. 19, the game processing executed by the game apparatus 3 will be described. When the game apparatus 3 is turned on, the CPU 30 of the game apparatus 3 executes a start program stored on a boot ROM (not shown) to initialize the elements including the main memory 33. The game program stored on the optical disc 4 is read to the main memory 33, and thus the CPU 30 starts executing the game program. The flowcharts shown in FIG. 16 and FIG. 17 illustrate the game processing executed after the above-described processing is completed. The processing loop of steps S1 through S19 shown in FIG. 16 and FIG. 17 is repeated for each frame.

Referring to FIG. 16, the CPU 30 executes initialization processing of various variables (step S1). Specifically, the CPU 30 sets the acceleration state 338 to "no acceleration state", and sets the alignment start flag 339 and the success flag 340 to be off. The CPU 30 also clears the acceleration data 335, the positive acceleration frame number 336, and the negative acceleration frame number 337.

Next, the CPU 30 obtains an acceleration value in the Z-axis direction (hereinafter, referred to as the "Z-axis acceleration value") from the series of operation information which is transmitted from the controller 7 as transmission data (step S2).

Based on the obtained acceleration value, the CPU 30 determines whether or not the acceleration in the negative direction (a series of changes in the acceleration value in the negative direction) has been completed (step S3). In other words, the CPU 30 determines whether or not the acceleration value increase/decrease direction has been changed (inverted) from the negative direction to the positive direction (whether or not the moving direction of the controller 7 has been changed from the positive direction to the negative direction). With reference to FIG. 13, for example, the determination result is YES at point 134. Point 134 (acceleration value in the current frame) has a larger value than point 131 (acceleration value in the immediately previous frame). Therefore, it is determined that the acceleration value increase/decrease direction has been changed. Specifically, it is determined whether or not the following condition is fulfilled in this step.

(acceleration state 338≠negative acceleration completion) AND (acceleration value in the current frame>acceleration value in the immediately previous frame) AND (acceleration value in the immediately previous frame<predetermined constant)

As the predetermined constant, −1 is used. This value is related to the difficulty level of the game. As this value is closer to −2, the tapping operation is less likely to be detected, namely, the difficulty level of the game is increased. Here, the value of −1 is used in order to provide an appropriate difficulty level.

When it is determined that the above condition is not fulfilled (NO in step S3), the CPU 30 determines whether or not the acceleration in the positive direction (a series of changes in the acceleration value in the positive direction) has been completed (step S17). In other words, the CPU 30 determines whether or not the acceleration value increase/decrease direction has been changed from the positive direction to the negative direction. With reference to FIG. 13, for example, the determination result is YES at point 136. Point 136 (acceleration value in the current frame) has a smaller value than the acceleration value in the immediately previous frame. Therefore, it is determined that the acceleration value increase/decrease direction has been changed from the positive direction to the negative direction. Specifically, it is determined whether or not the following condition is fulfilled in this step.

(acceleration state 338≠positive acceleration completion) AND (acceleration value in the current frame<acceleration value in the immediately previous frame) AND (acceleration value in the immediately previous frame>predetermined constant)

As the predetermined constant, −0.4 is used. The constant is provided so that, for example, a subtle change occurring while the acceleration value in the positive direction is increasing, as represented by circle 137 in FIG. 13 (a subtle change detected for some reason despite that the controller 7 has not been completely lowered), is not incorrectly recognized as indicating that the controller 7 has hit the palm. In other words, although the acceleration value increase/decrease direction is momentarily inverted, such a change in the acceleration value is not regarded as an inversion and the acceleration value is treated as still increasing in the positive direction. Referring to FIG. 13, if the acceleration value increase/decrease direction is inverted at −0.6 in circle 137 and then lowered close to −2, the operation of interest is not determined to be a tapping operation. Namely, an operation of tapping the controller 7 on the palm with a small motion of hand is not detected as a tapping operation.

When it is determined that the acceleration in the positive direction has not been completed (NO in step S17), the CPU 30 advances the processing to step S11 described later. By contrast, when it is determined that the acceleration in the positive direction has been completed (YES in step S17), the CPU 30 sets the acceleration state 388 to "positive acceleration completion" (step S18). Then, the CPU 30 executes positive acceleration frame number calculation processing (step S19) in order to calculate the number of frames required to make a series of changes in the acceleration value in the positive direction, which has been completed above.

Figure 18:
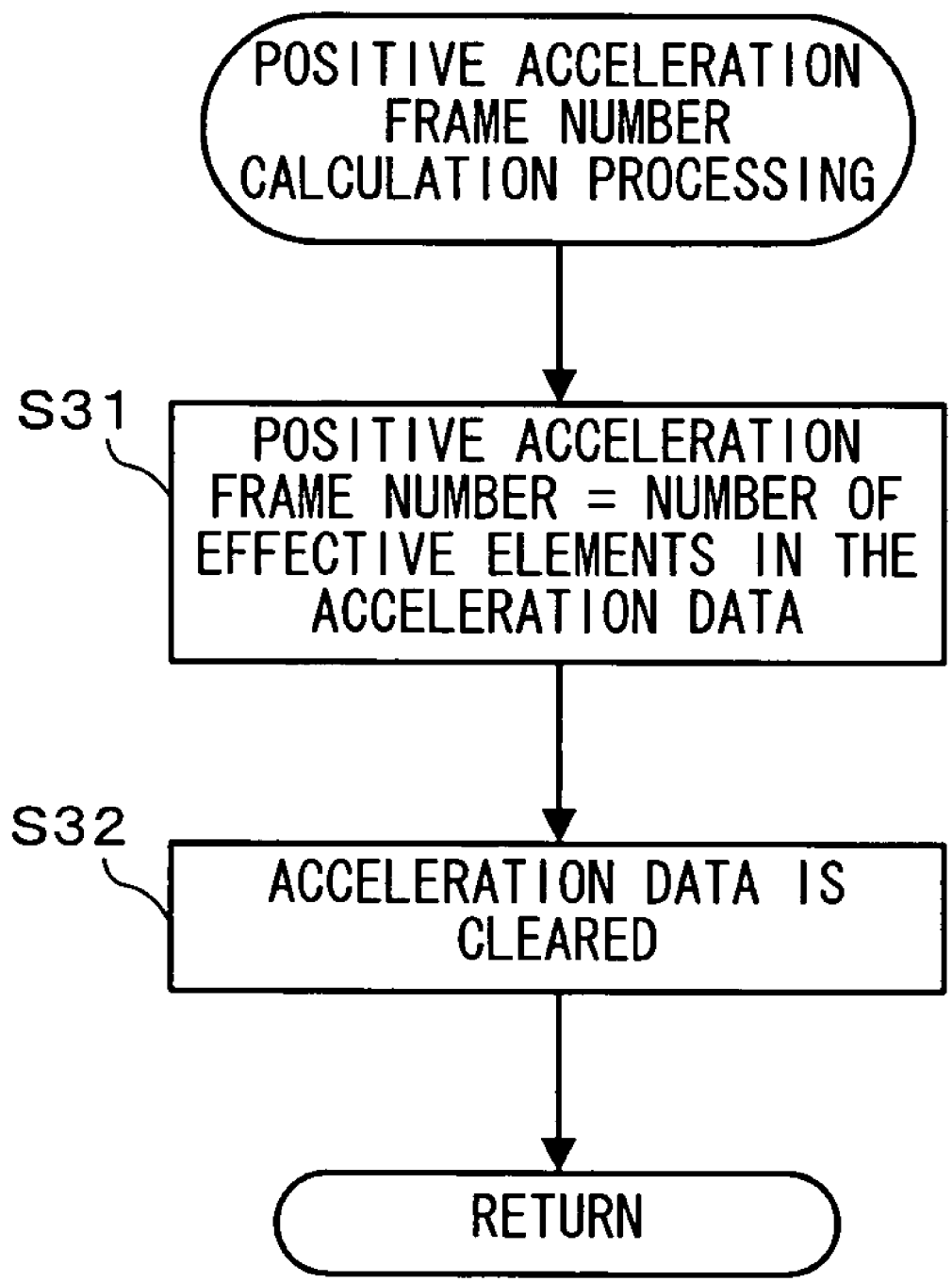
FIG. 18 is a flowchart illustrating positive acceleration frame number calculation processing shown in step S19 in FIG. 16 in detail.

FIG. 18 is a flowchart illustrating the positive acceleration frame number calculation processing shown in step S19 in detail. Referring to FIG. 18, the CPU 30 sets, in the positive acceleration frame number 336, the number of pieces of data representing acceleration values currently stored (number of effective elements) among the 20 Z-axis direction acceleration values (Z-axis acceleration data 3353*a* through 3353*t*) (step S31). For example, when the Z-axis acceleration data 3353a through 3353p each represent an acceleration value and the Z-axis acceleration data 3353q through 3353t are empty, the value of 16 is set in the positive acceleration frame number 336. This value represents the number of frames (time) required to make a series of changes in the acceleration value in the positive direction. Then, the CPU 30 clears the acceleration data 335 (step S32). Thus, the positive acceleration frame number calculation processing is terminated. The CPU 30 advances the processing to step S11 described later.

Returning to FIG. 16, when it is determined in step S3 that the acceleration in the negative direction has been completed (YES in step S3), the CPU 30 sets the acceleration state 388 to "negative acceleration completion" (step S34). Then, the CPU 30 executes negative acceleration frame number calculation processing (step S5) in order to calculate the number of frames required to make a series of changes in the acceleration value in the negative direction, which has been completed above.

Figure 19:
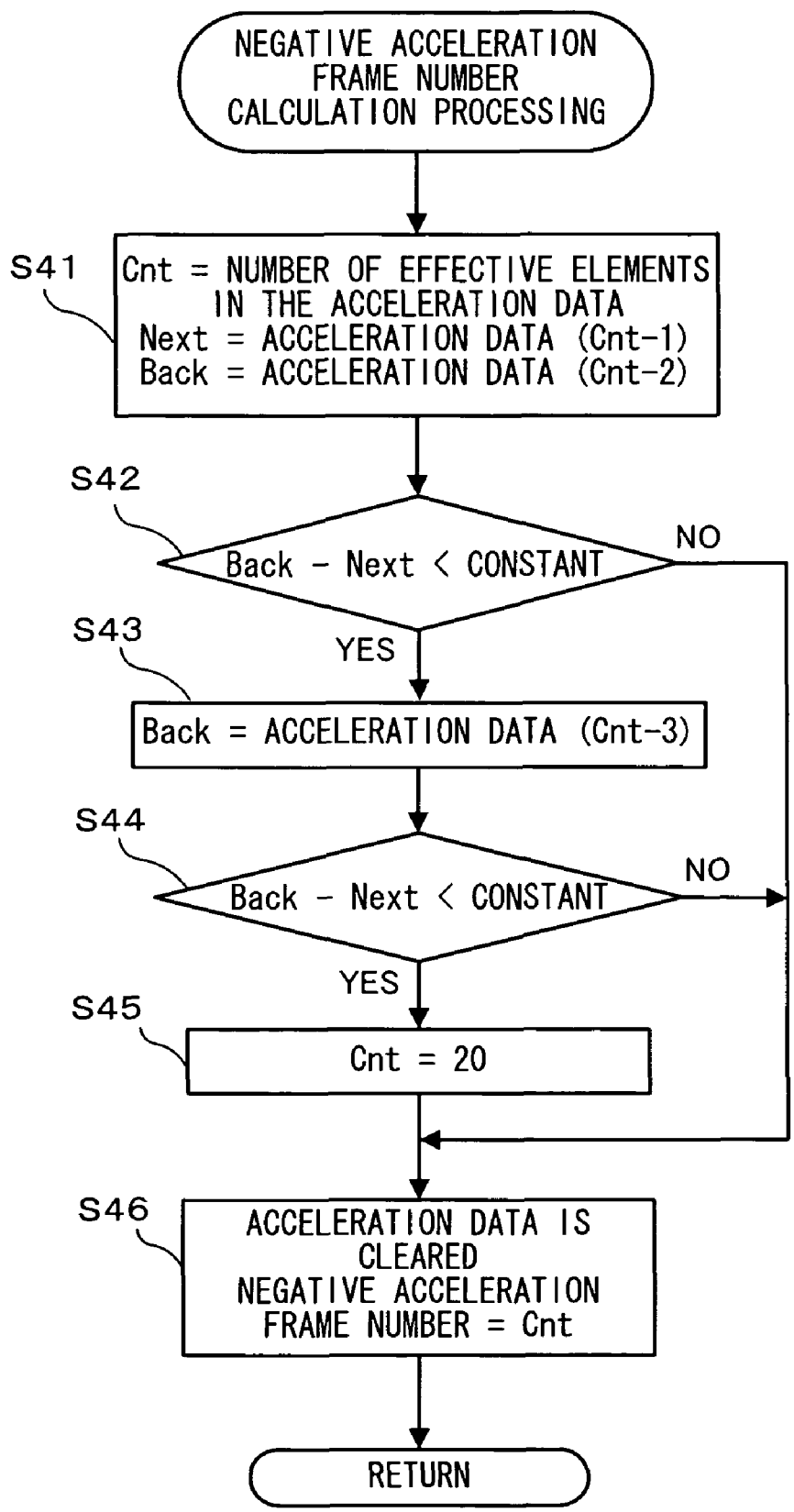
FIG. 19 is a flowchart illustrating negative acceleration frame number calculation processing shown in step S5 in FIG. 16 in detail.

FIG. 19 is a flowchart illustrating the negative acceleration frame number calculation processing shown in step S5 in detail. Referring to FIG. 19, the CPU 30 sets various variables (step S41). Specifically, the CPU 30 sets, in variable Cnt, the number of pieces of data representing acceleration values currently stored (number of effective elements) among the 20 Z-axis direction acceleration values. For example, when the Z-axis acceleration data 3353a through 3353g each represent an acceleration value and the Z-axis acceleration data 3353h through 3353t are empty, the value of 7 is set in variable Cnt. The CPU 30 also sets, in variable Next, the (Cnt−1)th acceleration data. Referring to FIG. 13, acceleration data at point 131 is set. The CPU also sets, in variable Back, the (Cnt−2)th acceleration data. Referring to FIG. 13, acceleration data at point 132 is set.

Then, the CPU 30 determines whether or not a value calculated by the expression "variable Back−variable Next" is smaller than a predetermined constant (step S42). Referring to FIG. 13, it is determined whether or not the difference in acceleration value between point 131 and point 132 is smaller than the predetermined constant. When this difference is large to some extent, it is determined that the operation of interest is a tapping operation. When this difference is small, it is determined that the operation of interest is not a tapping operation. As described above with reference to FIG. 13 and FIG. 14, the change in acceleration value which occurs when the vertical downward movement for a tapping operation is completed (point 131 and point 132 in FIG. 13) is much larger than the change in acceleration value which occurs when the controller 7 is swung down in the air (point 142 and point 143 in FIG. 14). Therefore, it can be determined whether or not the operation of interest is a tapping operation by checking the difference. When it is determined in step S42 that the difference is not smaller than the predetermined constant (NO in step S42), the difference is large to some extent, i.e. the operation of interest is considered to be a tapping operation. The CPU 30 advances the processing to step S46 described later.

By contrast, when it is determined in step S42 that the difference is smaller than the predetermined constant (YES in step S42), the CPU 30 sets, in variable Back, the (Cnt−3)th acceleration data (step S43). Referring to FIG. 13, acceleration data at point 133 is set. Like in step S42, the CPU 30 determines whether or not the difference between the data in Back and the data in Next is smaller than the predetermined constant (step S44). The determination on the acceleration value difference is performed twice in order to more accurately detect a tapping operation. Even if the difference between point 131 and point 132 is small, if the difference between point 131 and point 133 (the value in the current frame and the value two frames before) is large, the operation of interest is considered to be a tapping operation. Therefore, the determination is performed twice in order to avoid a tapping operation from being undetected.

When it is determined the second time that the difference is smaller than the predetermined constant (YES in step S44), the CPU 30 determines that the operation of interest is not a tapping operation and sets 20 in variable Cnt (step S45). "20" is the maximum number of pieces of data which can be stored in the Z-axis acceleration data 3353. By contrast, when it is determined in step S44 that the difference is not smaller than the predetermined constant (NO in step S44), the operation of interest is considered to be a tapping operation. The CPU 30 advances the processing to step S46.

Next, the CPU 30 clears the acceleration data 335. The CPU 30 also sets the value of variable Cnt in the negative acceleration frame number 337 (step S46). For example, when the operation of interest is determined above to be a tapping operation, the value of 7 is set in the negative acceleration frame number 337 (which indicates that the time of 7 frames was required to make a series of changes in the acceleration value in the negative direction). When the operation of interest is determined not to be a tapping operation, the value of 20 is set in the negative acceleration frame number 337 (which indicates that the time of 20 frames was required to make a series of changes in the acceleration value in the negative direction). Thus, the negative acceleration frame number calculation processing is terminated.

Returning to FIG. 16, after the negative acceleration frame number calculation processing, the CPU 30 determines whether or not the writing sheets 101 have been successfully aligned (step 6). Specifically, the CPU 30 determines whether or not the following condition is fulfilled.

(positive acceleration frame number+negative acceleration frame number>constant) AND (negative acceleration frame number≦positive acceleration frame number)

As the constant, 10 is used, for example. This constant is used so that an operation of wiggling the controller 7 is not incorrectly detected as a tapping operation. When the total number of frames required to lower and raise the controller 7 is smaller than the constant, the operation of interest is considered to be an operation of wiggling the controller 7. The condition of (negative acceleration frame number≦positive acceleration frame number) is provided because in the case of a tapping operation, the negative acceleration frame number is smaller than the positive acceleration frame number. When the controller 7 is swung in the air, the number of frames required for raising the controller 7 is substantially equal to the number of frames required for lowering the controller 7. When it is determined in step S5 that the operation of interest is not a tapping operation (YES in step S44), the negative acceleration frame number is set to 20. This is performed so that the condition (negative acceleration frame number≦positive acceleration frame number) is not fulfilled, i.e., so that the operation of interest is not incorrectly detected as a tapping operation. In this embodiment, even when the negative acceleration frame number is equal to the positive acceleration frame number, the operation of interest is treated as a tapping operation in order to raise the difficulty level of the game. With the condition of (negative acceleration frame number<positive acceleration frame number), the detection accuracy of the tapping operation is increased.

When it is determined in step S6 that the condition is fulfilled (YES in step S6), the CPU 30 sets the success flag 340 to be on (step S7). By contrast, when it is determined in step S6 that the condition is not fulfilled (NO in step S6), the CPU 30 sets the success flag 340 to be off (step S8).

Next, the CPU 30 determines whether or not the positive acceleration frame number is greater than 0 (step S9), in order to determine whether or not the tapping operation has changed. Owing to this, a change to the negative direction which is detected in the state where the change to the positive direction has not been started (for example, circle 138 in FIG. 13) is excluded from the determination target of the target operation. When it is determined in step S9 that the positive acceleration frame number is greater than 0 (YES in step S9), the CPU 30 sets the alignment start flag 339 to be on (step S10), and advances the processing to step S11. By contrast, when it is determined in step S9 that the positive acceleration frame number is not greater than 0 (NO in step S9), the CPU 30 advances the processing to step S11 without changing the setting of alignment start flag 339.

Next, the CPU 30 updates the acceleration data (step S11), namely, stores the acceleration value in the current frame in the acceleration data 335.

Then, the CPU 30 determines whether or not the alignment flag 339 is on (step S12 in FIG. 17). When it is determined that the alignment flag 339 is on (YES in step S12), the CPU 30 determines whether or not the success flag 340 is on (step S13). When it is determined that the success flag 340 is on (YES in step S13), the CPU 30 displays an animation of the writing sheets 101 being aligned (step S14). In the case where the animation of the writing sheets 101 being aligned is represented in four frames, one frame is displayed (i.e., the animation corresponding to one cycle of the tapping operation is displayed). When it is determined that the success flag 340 is off (NO in step S13), the CPU 30 displays an animation of the writing sheets 101 coming apart (step S15). In this case also, one frame is displayed.

Then, the CPU 30 determines whether or not the condition for terminating the game is fulfilled (step S16). Specifically, the CPU 30 determines whether or not the clearing condition is fulfilled, or whether or not the time limit has come. The clearing condition is, in the case where the animation of the writing sheets 101 being gradually aligned is represented in four frames, whether or not the loop in which the success flag 340 is on was continued four times (i.e., whether or not the controller 7 was tapped on the palm four times). When it is determined that the condition for terminating the game is not fulfilled (NO in step S16), the CPU 30 returns to step 2 to repeat the above-described processing. By contrast, when it is determined that the condition for terminating the game is fulfilled (YES in step S16), the CPU 30 terminates the game. The game processing in this embodiment is executed in this manner.

As described above, in this embodiment, an operation of applying an impact to an input device (tapping operation) can be accurately detected based on the difference in acceleration value obtained when the acceleration value increase/decrease direction is inverted. Namely, it is possible to distinguish an operation of swinging the controller 7 in the air from an operation of tapping the controller 7 on the palm of the hand. The difference in acceleration value at the time of inversion is calculated using two types of time interval. Therefore, the tapping operation is avoided from being undetected, and thus more accurate detection is realized. Based on the number of frames (time) required to increase or decrease the acceleration value corresponding to one cycle of the operation of interest, it is determined whether the operation of interest is a tapping operation or not. Therefore, it can be determined more accurately whether the operation applied to the input device is a tapping operation or not.

Even when the acceleration value increase/decrease direction is inverted from the positive direction to the negative direction, if the acceleration value at that time is not sufficiently large as represented by circle 137 in FIG. 13, such an inversion is not treated as an inversion of the acceleration value increase/decrease direction. Owing to this, an operation of tapping the controller 7 lightly on the palm so that the acceleration value increases or decreases only little (i.e., the motion of the hand is small) is not detected as a tapping operation. Therefore, more accurate detection of the tapping operation is provided.

In the above embodiment, it is determined whether or not an impact has been applied to the input device when the acceleration value increase/decrease direction in the positive or negative direction is inverted. At this point, the strength of the impact may also be determined. For example, when the acceleration value increase/decrease direction is determined to be inverted from the negative direction to the positive direction, it is determined whether or not the immediately previous acceleration value (point 131 in FIG. 13) is equal to or greater than a predetermined value. Depending on the determination result, different game processing may be executed (for example, the success flag 340 is set to be on or off). Namely, when the immediately previous acceleration value is equal to or greater than the predetermined value, it may be determined that the impact is small, and otherwise, it may be determined that the impact is large. In accordance with the determination result, different game processing may be executed. Instead of determining whether or not the acceleration value is greater or smaller than the predetermined value, game processing to be executed may be varied by more steps in accordance with the acceleration value (strength of the impact). Namely, game processing to be executed may be varied in units of −0.1 G, i.e., in accordance with whether the acceleration value is −2 G, −1.9 G, −1.8 G . . . . In this manner, the content or strategy of the game can be more widely varied, which makes the game more amusing.

A storage medium and a game apparatus as disclosed herein may accurately detect an operation of applying an impact to an input device, and are useful for, for example, games in which game objects are operated in accordance with the motion of the game controller, or information processing by which the display information or the like is moved in accordance with the motion of the input device.

While the invention has been described in detail, the foregoing description is in all aspects illustrative and not restrictive. It is understood that numerous other modifications and variations can be devised without departing from the scope of the invention.

What is claimed is:

1. A non-transitory storage medium having stored thereon a game program for causing a computer of a game apparatus to execute game processing based on an input value which changes in accordance with a motion of an input device itself, the game program causing the computer to execute:
   an acceleration value obtaining process that sequentially obtains, as the input value, an acceleration value which changes in accordance with a state of the input device, based on an output from an acceleration sensor included in the input device, and storing the acceleration value in a storage section;
   an increase/decrease direction reversal detection process that detects an acceleration value increase/decrease direction has reversed-based on the acceleration value stored in the storage section;
   an acceleration value difference calculation performed after the acceleration value increase/decrease direction has reversed, and calculating a difference between at least two acceleration values obtained immediately before the reversal; and a game processing process performed in response to both the detection of the reversals of the acceleration direction and the difference calculated in the acceleration value difference calculation process is equal to or greater than a predetermined value, executing first game processing, and while the difference calculated in the acceleration value difference calculation process is smaller than the predetermined value, wherein the game processing process includes execution of a second game processing which is different from the first game processing.

2. A non-transitory storage medium according to claim 1, wherein the increase/decrease direction reversal-detection process includes:

a first reversal detection process which detects that the acceleration value increase/decrease direction has reversed from a first direction to a second direction; and a second reversal detection process, performed after the detection in the first reversal detection process, which detects that the acceleration value increase/decrease direction has reversed from the second direction to the first direction; and in the acceleration value difference calculation process, when the second reversal detection process detects the reversal, the computer calculates a difference between at least two acceleration values obtained immediately before the second reversal.

3. A non-transitory storage medium according to claim 2, wherein the acceleration value difference calculation process includes:

a first difference calculation process which calculates a first difference between two acceleration values obtained at a first time interval immediately before the reversal detected in the second reversal detection process; and a second difference calculation process which calculates a second difference between two acceleration values obtained at a second time interval, which is different from the first time interval, immediately before the reversal detected in the second reversal detection process; and in the game processing process, when at least one of the first difference and the second difference is equal to or greater than the predetermined value, the computer executes the first game processing; and when both the first difference and the second difference are smaller than the predetermined value, the computer executes the second game processing.

4. A non-transitory storage medium according to claim 2, wherein the game program causes the computer to further execute:

a first obtained value counting process which counts a first number of acceleration values obtained in the acceleration value obtaining process after the detection in the first reversal detection process before the detection in the second reversal detection process; and a second obtained value counting process which counts a second number of acceleration values obtained after the detection in the second reversal detection process before the detection in the first reversal detection process;

wherein in the game processing process, only when a sum of the first number and the second number is equal to or greater than a predetermined value and the first number is smaller than the second number, the computer executes the first game processing.

5. A non-transitory storage medium according to claim 2, wherein in the acceleration value difference calculation process, only when the acceleration value when the reversal is detected in the first reversal detection process is equal to or greater than a predetermined value, the computer calculates the difference between the two acceleration values.

6. A non-transitory storage medium according to claim 2, wherein the game program causes the computer to further execute:

an acceleration determination process when the reversal is detected in the second reversal detection process, and to determine whether or not the acceleration value obtained immediately before the reversal is equal to or greater than a predetermined value;

wherein in the game processing process, when the acceleration value is determined to be equal to or greater than the predetermined value in the acceleration determination process, the computer executes the first game processing; and when the acceleration value is determined to be smaller than the predetermined value in the acceleration determination process, the computer executes the second game processing.

7. A game apparatus for executing a game process based on an input value which changes in accordance with a motion of an input device itself, the game apparatus comprising:

an acceleration value obtaining section sequentially obtaining, as the input value, an acceleration value which changes in accordance with a state of the input device, based on an output from an acceleration sensor included in the input device, and storing the acceleration value in a storage section;

an increase/decrease direction reversal detection section detecting that an acceleration value increase/decrease direction has reversed based on the acceleration value stored in the storage section;

an acceleration value difference calculation section for, when the acceleration value increase/decrease direction has reversed, calculating a difference between at least two acceleration values obtained immediately before the reversal; and a game processing section for, when the both the detection of the reversal of the acceleration value and the difference calculated by the acceleration value difference calculation section being equal to or greater than a predetermined value, executing first game processing; and when the difference calculated by the acceleration value difference calculation section is smaller than the predetermined value, executing second game processing which is different from the first game processing.

8. A game apparatus according to claim 7, wherein the increase/decrease reversal detection section includes:

a first reversal detection section for detecting that the acceleration value increase/decrease direction has reversed from a first direction to a second direction; and a second reversal detection section for, after the first reversal detection section detects the reversal, detecting that the acceleration value increase/decrease direction has reversed from the second first direction to the first direction; and when the second reversal detection section detects that the reversal, the acceleration value difference calculation section calculates a difference between at least two acceleration values obtained immediately before the reversal.

9. A non-transitory storage medium storing a program causing a computer to detect an abrupt movement of a device having an acceleration sensor, the game program causing the computer to execute:

sequentially collecting acceleration data generated by the acceleration sensor, wherein the acceleration data indicates movement of the device;

determining a reversal time corresponding to a reversal of a direction of acceleration in the stored acceleration data;

calculating a difference in acceleration values of the stored acceleration data during a period adjacent the reversal time, and determining that the device has undergone an abrupt movement if both the difference is greater than a predetermined difference value and the determination of the reversal time.

10. The non-transitory storage medium of claim 9 wherein the predetermined time period has an end at the reversal time.

11. The non-transitory storage medium of claim 9 wherein the predetermine time period precedes the reversal time.

12. The non-transitory storage medium of claim 9 wherein the predetermine time period corresponds to the acceleration data collected at successive times.

13. The non-transitory storage medium of claim 9 wherein the acceleration sensor senses acceleration in a vertical direction, the acceleration data represents acceleration of the device in the vertical direction and the reversal of a direction is a reversal of an acceleration in the vertical direction.

14. The non-transitory storage medium according to claim 9 wherein the determination of the reversal time includes:

detecting a first reversal in the direction of acceleration and detecting a second reversal in the direction of acceleration, wherein the second reversal is subsequent and opposite to the first reversal, and wherein the reversal time corresponds to the second reversal.

15. The non-transitory storage medium according to claim 14:

wherein the calculation of the difference in the acceleration values includes calculating a second difference between acceleration values corresponding to acceleration data collected during a second time interval immediately preceding the first reversal, and the determination that the device has undergone an abrupt movement further includes determining that the device has undergone the abrupt movement if the second difference is greater than the predetermined difference value.

16. A video game playing system comprising:

an input device generating a sequence of acceleration values based on a motion of the input device;

a processing unit configured to execute video game software based on an input value which changes in accordance with the motion of the input device;

said processing unit configured to sequentially obtain as the input value each of the acceleration values;

an increase/decrease direction reversal detector that detects when an acceleration value increase/decrease direction has reversed based on the acceleration values in the input value;

an acceleration value difference calculation unit which, when the acceleration value increase/decrease direction reverses calculates a difference between at least two acceleration values obtained immediately before the reversal; and a game processing unit which performs a first game processing in response to both the detection of the reversed acceleration reversal and the calculated difference being equal to or greater than a predetermined value, and performs a second game processing in response to both the detection of the reversal acceleration reversal and the calculated difference being smaller than the predetermined value, wherein the second game processing is different from the first game processing.

17. A system comprising:

an input device having an acceleration sensor generating a sequence of acceleration values based on a motion of the input device;

a computer;

a non-transitory storage medium storing a program causing the computer to detect an abrupt movement of the input device, wherein the program causes the computer to:

sequentially collect and store acceleration data generated by the acceleration sensor, wherein the acceleration data indicates movement of the input device;

determine a reversal time corresponding to a reversal of a direction of acceleration in the acceleration data;

calculate a difference in acceleration values of the acceleration data during a period synchronized with the reversal time;

determine that the device has undergone an abrupt movement if the calculated difference is greater than a predetermined difference value and contemporaneously with the reversal time, and generate a signal identifying the abrupt movement of the input device.

18. A method performed using a game apparatus including a user input device, a computer and a non-transitory storage medium having stored thereon a game program for causing the computer to execute game processing based on an input value which changes in accordance with a motion of the user input device, the method comprising:

sequentially obtaining as the input value an acceleration value varying in accordance with an output from an acceleration sensor included in the input device, and storing each of the acceleration values;

detecting an reversal of a direction of acceleration based on the stored acceleration values;

calculating an acceleration value difference in response to the detection of the reversal of acceleration wherein the calculated difference is a difference between at least two acceleration values obtained during a period immediately before the detected reversal; and performing a first game process in response to both the detection of the reversal and the calculated difference being equal to or greater than a predetermined value, and performing a second game process in response to both the detection of the reversal and the calculated difference being smaller than the predetermined value, wherein the second game process is different from the first game process.

19. A method to detect an abrupt movement of a system having an input device with an acceleration sensor, a computer and a game program stored on a non-transitory storage medium, the game program causing the computer to:

sequentially collect and store acceleration data generated by the acceleration sensor, wherein the acceleration data indicates movement of the input device;

determine a reversal time corresponding to a reversal of a direction of acceleration represented by the stored acceleration data;

calculate a difference in acceleration values of the stored acceleration data during a period adjacent to the reversal time, and determine that the input device has undergone an abrupt movement if the difference is greater than a threshold difference value and in response to the reversal.

20. A system to detect an abrupt movement comprising:

an input device including an accelerometer generating acceleration data indicative of movement changes by the input device;

a processor and a non-tangible storage medium storing a program which when executed by the processor causes the system to:

sequentially collect and store the acceleration data, wherein the acceleration data indicates a magnitude and timing of acceleration by the input device;

identify a time at which a reversal occurs in a direction of acceleration of the input device by monitoring the collected acceleration data;

calculate a difference in acceleration values by comparing acceleration data collected during a period immediately prior to the identified time of the reversal; and issue a notice of an abrupt movement of the input device if both the time of reversal is identified and the calculated difference is greater than a threshold acceleration difference.

21. The system as in claim 20 wherein the collection, the identification and the calculation are performed contemporaneously with the collection of acceleration data, and the notice is issued substantially simultaneously with a movement of the input device corresponding to the reversal in the direction of acceleration.

22. The system as in claim 20 wherein the monitoring of the acceleration data includes determining whether the magnitude of the acceleration data is increasing or decreasing during each of successive periods, and identifying a pair of the successive periods during which the magnitude of the acceleration data switches between increasing and decreasing, wherein the identified pair of successive periods includes the time at which the reversal occurs.

23. The system as in claim 20 wherein the system is a game system which includes a display and the input device is a user input device, wherein the processor when executing the program causes the system to further:

respond to the notice by generating and displaying a first image on the display, wherein the first image corresponds to an abrupt movement of the user input device.

* * * * *